(12) United States Patent
Hatano et al.

(10) Patent No.: US 10,904,469 B2
(45) Date of Patent: Jan. 26, 2021

(54) IMAGING APPARATUS, IMAGING SYSTEM, MOVING OBJECT, AND CIRCUIT CHIP

(71) Applicant: CANON KABUSHIKI KAISHA, Tokyo (JP)

(72) Inventors: Yuuichirou Hatano, Kamakura (JP); Katsuhito Sakurai, Machida (JP); Atsushi Furubayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 16/142,731

(22) Filed: Sep. 26, 2018

(65) Prior Publication Data
US 2019/0104275 A1   Apr. 4, 2019

(30) Foreign Application Priority Data
Sep. 29, 2017   (JP) ................. 2017-192057

(51) Int. Cl.
*H04N 5/3745*   (2011.01)
*B60Q 9/00*   (2006.01)
*G05D 1/02*   (2020.01)
*H04N 9/04*   (2006.01)
*H04N 5/378*   (2011.01)

(52) U.S. Cl.
CPC ......... *H04N 5/37455* (2013.01); *B60Q 9/008* (2013.01); *G05D 1/0231* (2013.01); *H04N 5/378* (2013.01); *H04N 9/0455* (2018.08)

(58) Field of Classification Search
CPC ... H04N 5/37455; H04N 5/378; H04N 9/0455
See application file for complete search history.

(56) References Cited

U.S. PATENT DOCUMENTS

| 9,967,492 B2* | 5/2018 | Kobayashi | H04N 5/37455 |
| 2009/0128678 A1* | 5/2009 | Kitami | H04N 5/343 348/308 |
| 2010/0194948 A1* | 8/2010 | Murakami | H04N 5/3658 348/302 |
| 2010/0259662 A1* | 10/2010 | Oike | H04N 5/3741 348/308 |
| 2010/0271523 A1* | 10/2010 | Hara | H04N 5/367 348/302 |
| 2012/0104267 A1* | 5/2012 | Matsumoto | H04N 5/3559 250/370.08 |
| 2013/0016189 A1* | 1/2013 | Hosaka | H04N 13/122 348/49 |
| 2013/0144120 A1* | 6/2013 | Yamazaki | H04N 5/235 600/109 |

(Continued)

FOREIGN PATENT DOCUMENTS

| JP | 2015-186155 A | 10/2015 |
| JP | 2016225971 | * 12/2016 |

(Continued)

*Primary Examiner* — Md N Haque
(74) *Attorney, Agent, or Firm* — Canon U.S.A., Inc., IP Division

(57) ABSTRACT

An imaging apparatus is provided and is configured in such a manner that a plurality of first pixels are connected to a first AD conversion unit, and a plurality of second pixels are connected to a second AD conversion unit whereby the imaging apparatus has a beneficial connection relationship between the pixels and the AD conversion units.

22 Claims, 14 Drawing Sheets

(56) References Cited

U.S. PATENT DOCUMENTS

| | | | |
|---|---|---|---|
| 2013/0258170 A1* | 10/2013 | Tamaki | G03B 13/36 |
| | | | 348/349 |
| 2015/0189214 A1* | 7/2015 | Kurose | H01L 25/18 |
| | | | 250/208.1 |
| 2016/0330414 A1* | 11/2016 | Takado | H04N 9/045 |

FOREIGN PATENT DOCUMENTS

| | | |
|---|---|---|
| JP | 2017-059834 A | 3/2017 |
| WO | 13/145753 A1 | 10/2013 |
| WO | 2015-126043 A | 7/2015 |

\* cited by examiner

FIG.2

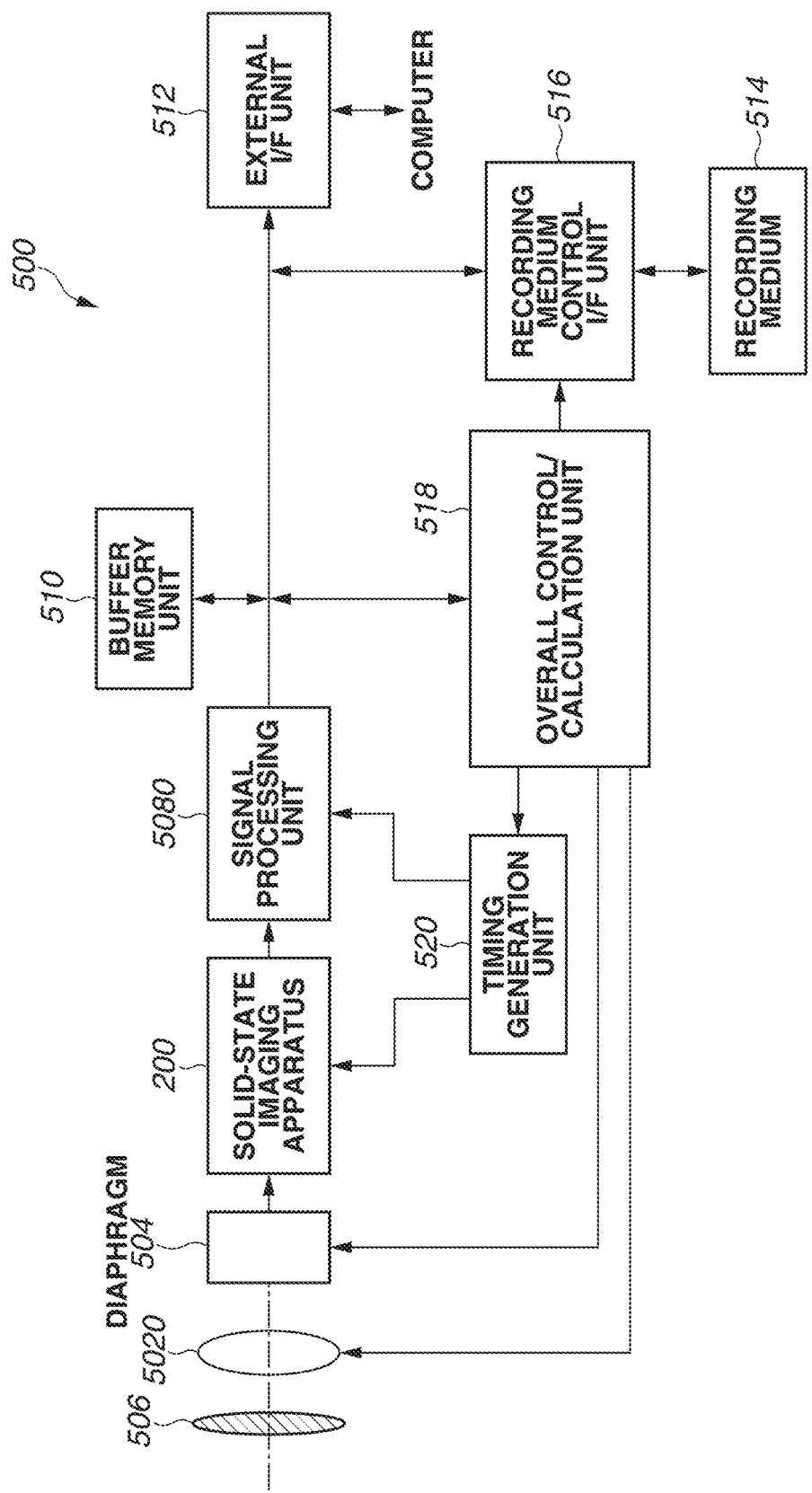

FIG.12B
FRONT VIEW
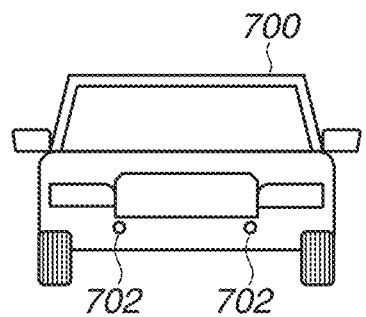
TOP VIEW
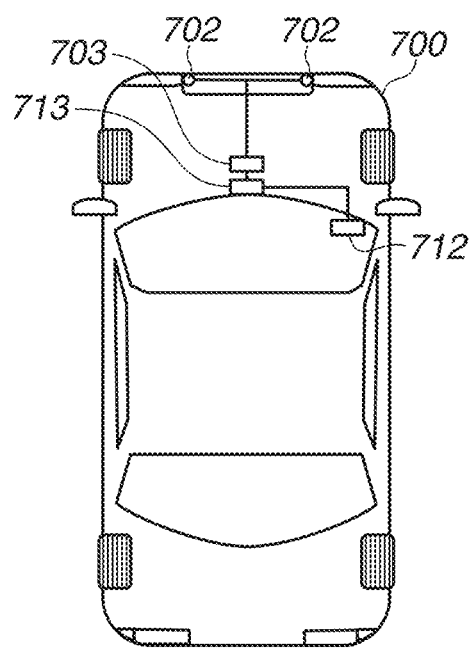
REAR VIEW
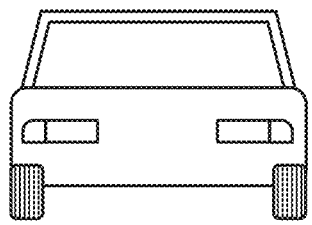

IMAGING APPARATUS, IMAGING SYSTEM, MOVING OBJECT, AND CIRCUIT CHIP

BACKGROUND

Field

The present invention relates to an imaging apparatus, an imaging system, and a moving object.

Description of the Related Art

There is known an imaging apparatus including a plurality of pixels arranged in a plurality of rows and a plurality of columns. As one example of this imaging apparatus, there is known an imaging apparatus discussed in Japanese Patent Application Laid-Open No. 2015-126043. In this imaging apparatus, a first chip and a second chip are laminated on each other with a plurality of pixels disposed on the first chip and analog-to-digital (AD) conversion units disposed on the second chip. The AD conversion units carry out AD conversions on signals output from the pixels.

SUMMARY OF THE DISCLOSURE

The present disclosure has been made in consideration of the above-described object, and according to an aspect of the disclosure, an imaging apparatus includes a first chip including a plurality of first pixels each including a color filter of a first color and a plurality of second pixels each including a color filter of a second color that is a different color from the first color, a second chip including a first analog-to-digital (AD) conversion unit and a second AD conversion unit, a first signal line to which the plurality of first pixels is connected, a second signal line to which the plurality of second pixels is connected, a connection portion at which the first signal line and the first AD conversion unit are connected to each other, and a connection portion different from the connection portion at which the second signal line and the second AD conversion unit are connected to each other.

Further features will become apparent from the following description of exemplary embodiments with reference to the attached drawings.

BRIEF DESCRIPTION OF THE DRAWINGS

FIG. 2 is a diagram illustrating a layout of pixels and signal processing circuits of the imaging apparatus in a planar view.

FIG. 11 is a block diagram illustrating a configuration of an imaging system.

FIGS. 12A and 12B are diagrams illustrating a configuration of a moving object.

DESCRIPTION OF THE EMBODIMENTS

The imaging apparatus discussed in Japanese Patent Application Laid-Open No. 2015-126043 fails to take into consideration a beneficial connection relationship between the pixels and the AD convention units. This imaging apparatus fails to take into consideration a beneficial connection relationship between the pixels and the AD conversion units in a case where a color filter of a first color is disposed on a plurality of first pixels and a color filter of a second color is disposed on a plurality of second pixels. For example, if one AD conversion unit carries out the AD conversion on a signal output from each of the first pixels equipped with the color filter of the first color and the second pixels equipped with the color filter of the second color, the imaging apparatus may have to perform processing according to each of the first color and the second color. In such a case, there arises an issue that the AD conversion or signal processing after the AD conversion becomes complicated.

A technique that will be described below relates to an imaging apparatus having the beneficial connection relationship between the pixels and the AD conversion units in the case where the color filter of the first color is disposed on the plurality of first pixels and the color filter of the second color is disposed on the plurality of second pixels.

In the following description, each of exemplary embodiments will be described with reference to the drawings. In the following description, assume that a transistor is a negative type (N-type) transistor unless otherwise indicated specifically. However, the exemplary embodiments that will be described below are not limited to the N-type transistor, and a positive type (P-type) transistor may be used as appropriate. In this case, potentials of a gate, a source, and a drain of the transistor can be changed as appropriate from descriptions in the exemplary embodiments. For example, for a transistor intended to operate as a switch, a similar result can be achieved by modifying the exemplary embodiments so as to reverse a low level and a high level of the potential to be supplied to the gate from the descriptions in the exemplary embodiments.

(Overall Configuration of Imaging Apparatus)

Figure 1:
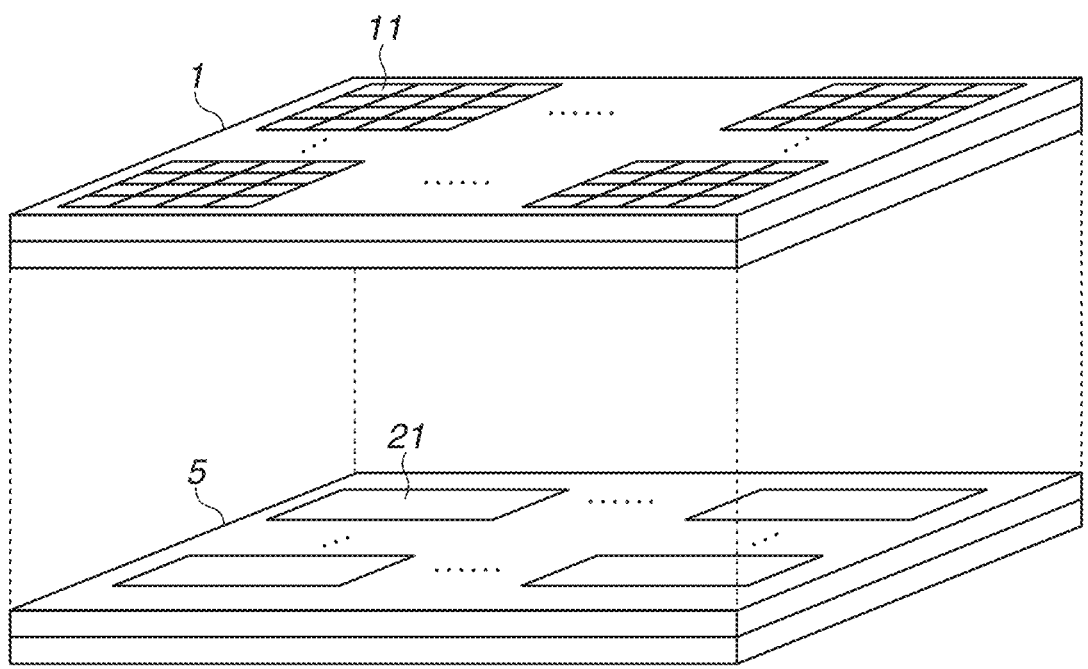
FIG. 1 is a diagram illustrating a configuration of an imaging apparatus.

FIG. 1 illustrates a first chip 1 and a second chip 5 provided to an imaging apparatus according to a first exemplary embodiment. The first chip 1 is a pixel chip on which pixels 11 are arranged in a plurality of rows and a plurality of columns. Further, the second chip 5 is a circuit chip on which signal processing circuits 21 are arranged in a plurality of rows and a plurality of columns. FIG. 1 illustrates only the pixels 11 and the signal processing circuits 21, but, besides them, control lines for controlling the pixels 11 and signal lines for transmitting signals output from the pixels 11 are disposed on the first chip 1 as appropriate. Further, a drive circuit such as a vertical scanning circuit and a timing generator is disposed on the first chip 1 or the second chip 5 as appropriate.

(Layout Relationship between Pixels and Signal Processing Circuits in Planar View)

Figure 2:
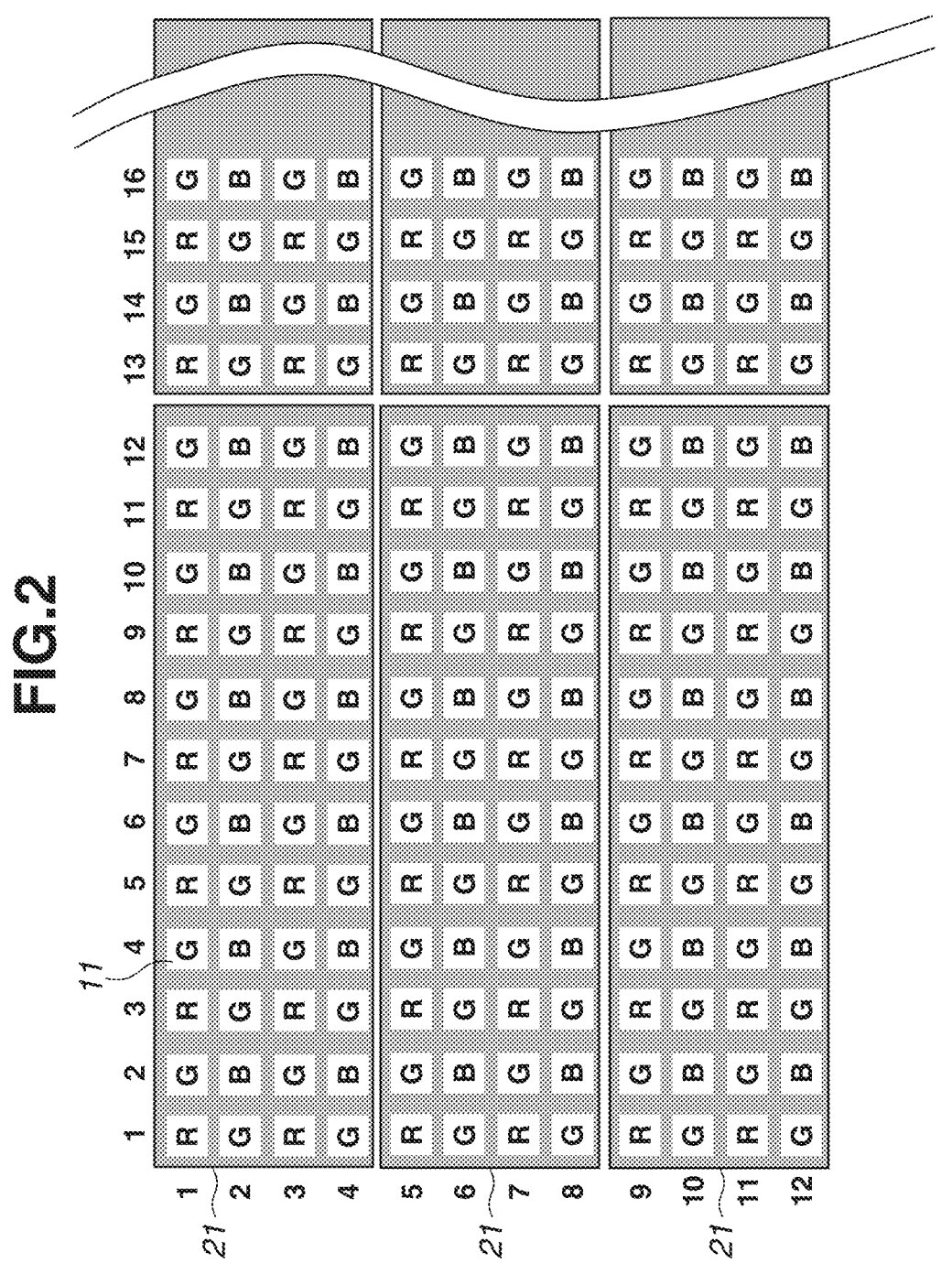

FIG. 2 illustrates a layout of the pixels 11 mounted on the first chip 1 and the signal processing circuits 21 mounted on the second chip 5 in a planar view. FIG. 2 also illustrates colors of color filters provided to the pixels 11 along therewith. The letter R in FIG. 2 indicates that the pixel 11 includes a red (R) color filter. The same also applies to subsequent colors, G and B, which indicate that the pixels 11 include a green (G) color filter and a blue (B) color filter, respectively.

In other words, it can also be stated that the imaging apparatus includes a pixel to which light of a wavelength corresponding to a first color is incident, and a pixel to which light of a wavelength corresponding to a second color is incident.

Typically, a wavelength corresponding to the red color is 600 to 830 nm. Further, a wavelength corresponding to the green color is 500 to 600 nm. Further, a wavelength corresponding to the blue color is 360 to 500 nm.

Further, the color of the color filter may be distinguished based on a peak wavelength at which a transmittance of the color filter reaches a peak. Typically, a peak wavelength of a transmittance of the blue color filter is approximately 450 nm. Further, a peak wavelength of a transmittance of the green color filter is approximately 540 nm. Further, a peak wavelength of a transmittance of the red color filter is approximately 630 nm.

The color filter of one pixel 11 may be formed by a single color filter member. Alternatively, the color filter of one pixel 11 may be embodied by such an example that color filter members having different compositions from each other are provided within an extent that allows a part and another part of a region where the color filter is provided to be regarded as substantially the same color.

One signal processing circuit 21 is disposed so as to overlap the pixels 11 arranged in a plurality of rows and a plurality of columns. In the present example, one signal processing circuit 21 is disposed so as to overlap the pixels 11 having four rows and twelve columns. As will be described below, the signal processing circuit 21 includes a multiplex circuit and an AD conversion circuit. Therefore, it can be said that one or both of the multiplex circuit and the AD conversion circuit of one signal processing circuit 21 are disposed so as to overlap the pixels 11.

Further, as will be described below, the AD conversion circuit of one signal processing circuit 21 carries out an AD conversion on a signal output from the pixel 11 including the color filter of the first color and does not carry out the AD conversion on a signal output from the pixel 11 including the color filter of the second color. Therefore, one or both of the AD conversion circuit and the multiplex circuit of one signal processing circuit 21 are in a relationship overlapping both the pixel 11 targeted for the AD conversion and the pixel 11 not targeted for the AD conversion in the planar view.

This layout is just one example, and the present exemplary embodiment can employ such a configuration that the pixels 11 in a plurality of rows and a plurality of columns are disposed with respect to one signal processing circuit 21.

(Equivalent Circuit of Imaging Apparatus)

Figure 3:
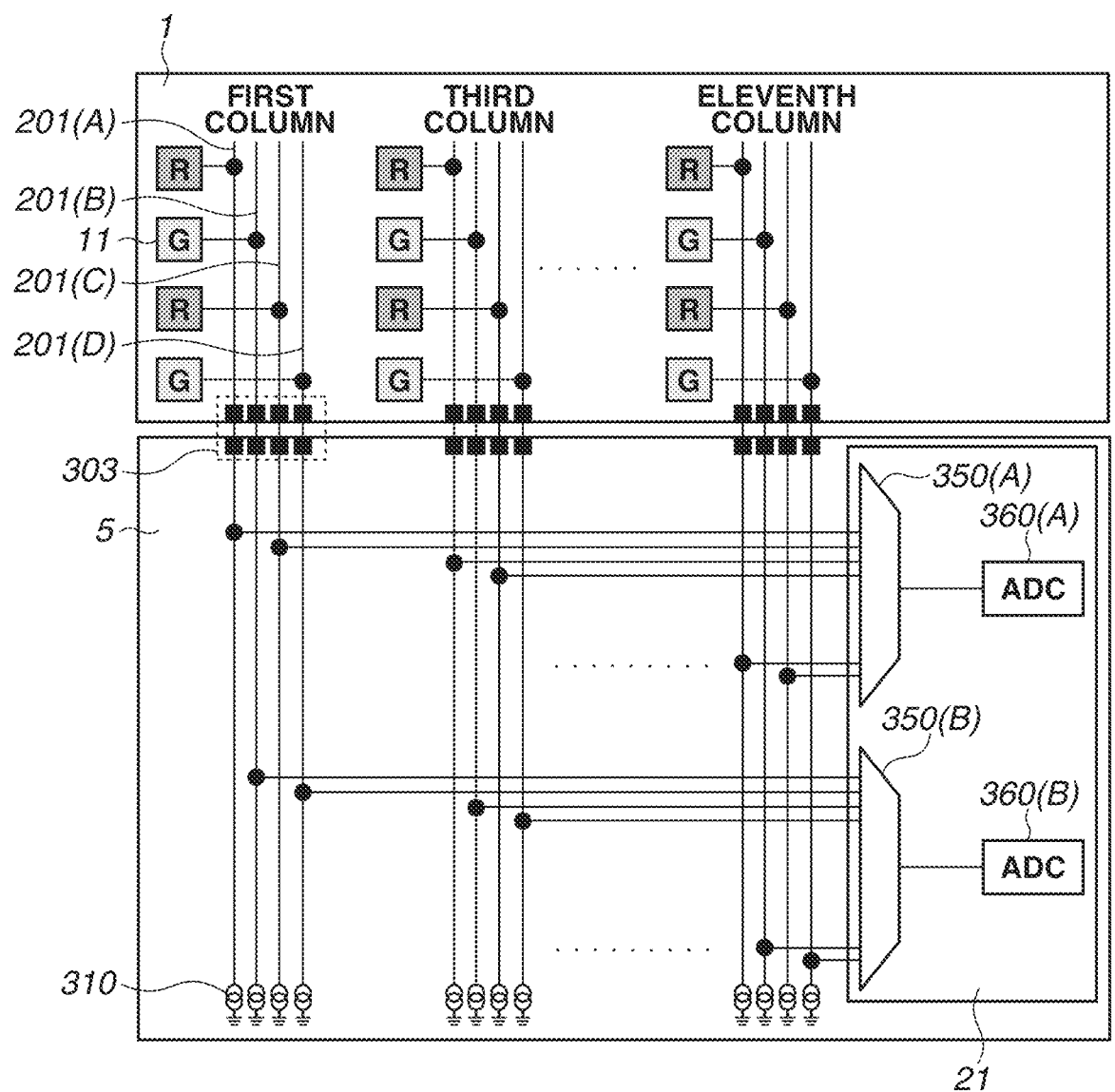
FIG. 3 is a diagram illustrating the pixels and the signal processing circuits.

FIG. 3 is a block diagram illustrating the imaging apparatus illustrated in FIGS. 1 and 2. FIG. 3 illustrates only the pixels 11 in odd-numbered columns among the pixels 11 illustrated in FIG. 2. The pixels 11 of the first chip 1 include four signal lines 201(A) to (D) for the pixels 11 in one column. Hereinafter, the signal lines 201(A) to (D) will be simply referred to as the signal line 201 when being described without being distinguished from one another. The pixel 11 in the first row is connected to the signal line 201(A). The same also applies to the pixels 11 in the subsequent second to fourth rows, which are connected to the signal lines 201(B) to (D) in this order, respectively. The signal lines 201(A) to (D) are also disposed in the other columns in a similar manner to the pixels 11 in the first column.

Each of the signal lines 201(A) and 201(C) is connected to a multiplex circuit (hereinafter referred to as an MPX circuit) 350(A) provided to the signal processing circuit 21 via a connection portion 303. Further, the signal processing circuit 21 includes AD conversion circuits (hereinafter referred to as ADCs in the specification and the drawings) 360(A) and 360(B). The MPX circuit 350(A) is a first selection unit including an input unit connected to the signal lines 201(A) and 201(C) and an output unit connected to the ADC 360(A).

Each of the signal lines 201(B) and 201(D) is connected to an MPX circuit 350(B) provided to the signal processing circuit 21 via the connection portion 303. The MPX circuit 350(B) is a second selection unit including an input unit connected to the signal lines 201(B) and 201(D) and an output unit connected to the ADC 360(B).

As illustrated in FIG. 3, all of the pixels 11 connected to the ADC 360(A) are the pixels 11 each including the R color filter. On the other hand, all of the pixels 11 connected to the ADC 360(B) are the pixels 11 each including the G color filter. In this manner, a plurality of first pixels 11 each including the color filter of the first color (R) is connected to the ADC 360(A), which is a first AD conversion unit, without being connected to the ADC 360(B), which is a second AD conversion unit. Further, a plurality of second pixels 11 each including the color filter of the second color (G) is connected to the ADC 360 (B), which is the second AD conversion unit, without being connected to the ADC 360(A), which is the first AD conversion unit.

Further, as illustrated in FIG. 3, the second chip 5 includes a current source 310. The current source 310 supplies a current to the signal line 201 of each of the columns via the connection portion 303.

(Cross-Sectional Structure Around Connection Portion of Imaging Apparatus)

Figure 4:
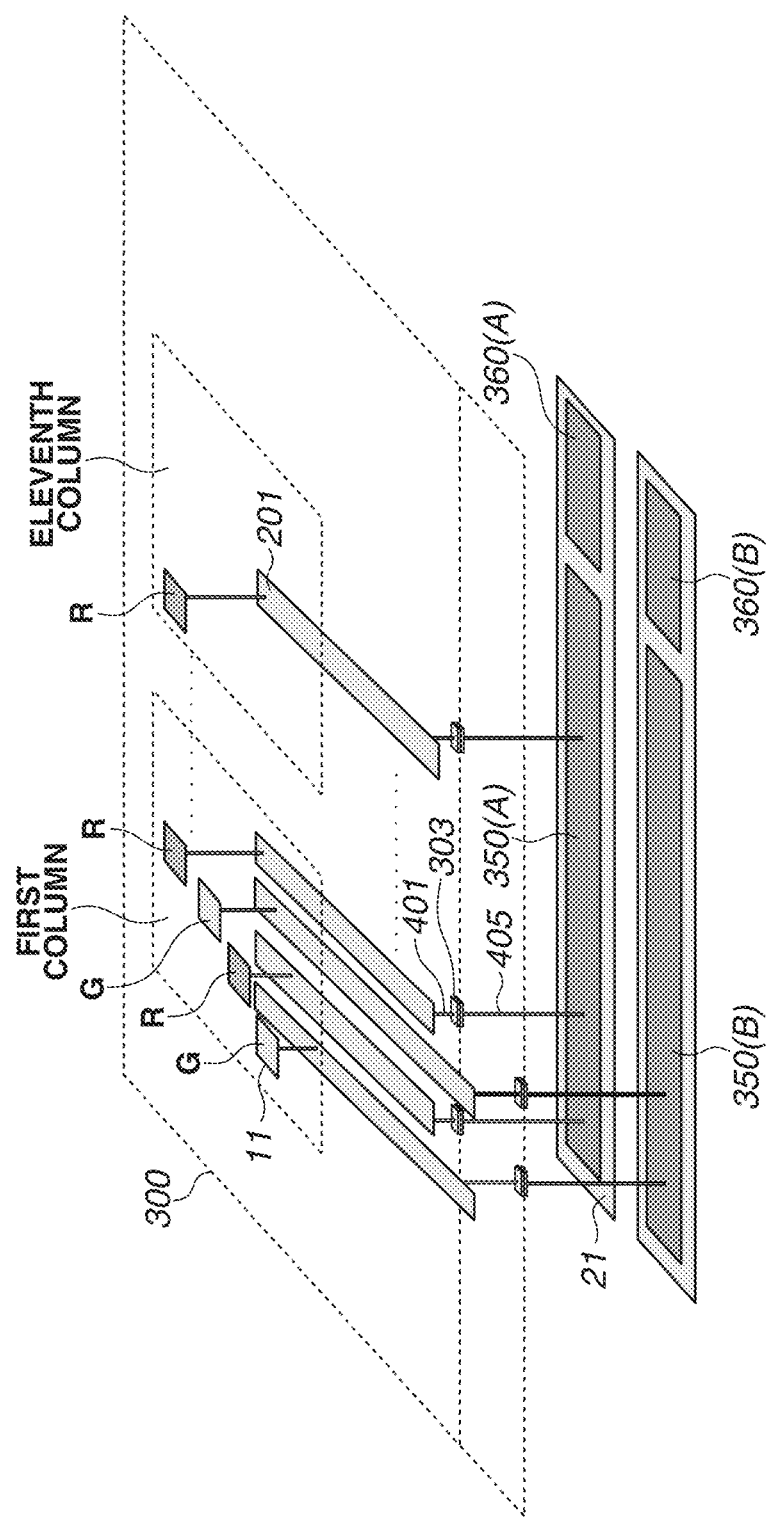
FIG. 4 is a diagram illustrating connections between the pixels and the signal processing circuits.

FIG. 4 is a perspective view of the imaging apparatus illustrated in FIG. 3. FIG. 4 illustrates the imaging apparatus, focusing on the pixel 11 disposed in the fourth row and the first column and the pixel 11 disposed in the first row and the eleventh column. The first chip 1 and the second chip 5 illustrated in FIG. 1 are joined to each other on a joint surface 300.

Figure 5:
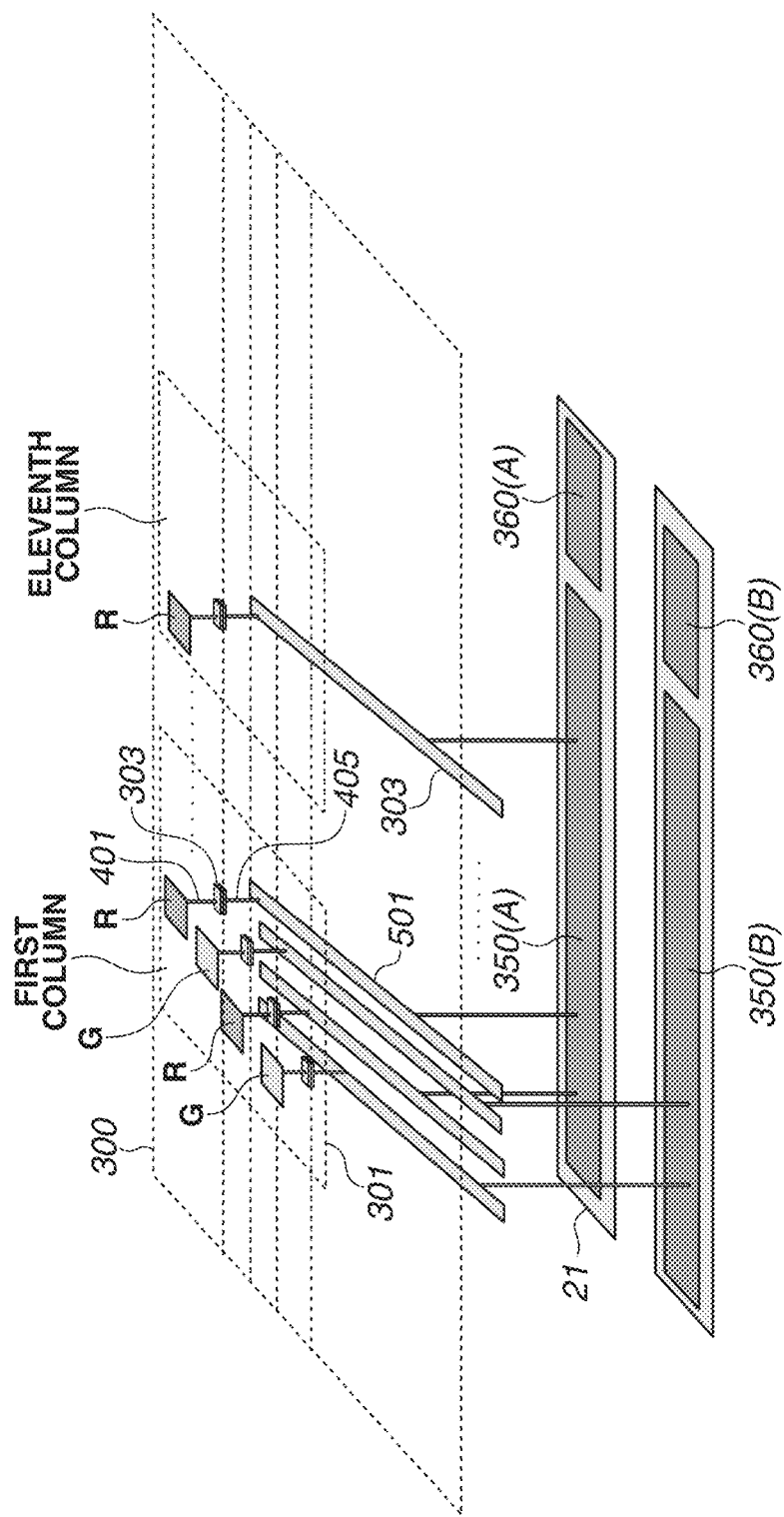
FIG. 5 is a diagram illustrating connections between the pixels and the signal processing circuits.

The imaging apparatus according to the present exemplary embodiment is a back-side illuminated imaging apparatus. The pixel 11 includes a not-illustrated photoelectric conversion unit. The signal line 201 is provided between this photoelectric conversion unit and the joint surface 300. The signal line 201 extends in a predetermined direction of the pixel 11 (a direction along the column in FIG. 4). The signal line 201 is connected to the connection portion 303 via a connection wiring 401. Further, the MPX circuit 350(A) is connected to the connection portion 303 via a connection wiring 405. The connection wiring 401, the connection wiring 405, and the connection portion 303 are disposed so as to overlap one another in the planar view. It can also be said that the connection between the signal processing circuit 21 and the signal line 201 can be established by forming the connection wiring 401 at a position that overlaps the connection wiring 405 in the planar view. Then, the signal line 201 and the MPX circuit 350 can be connected to each other by connecting the signal line 201 extending along the predetermined direction and the connection wiring 401. The signal line 201 extending in the predetermined direction can facilitate the connection between the connection wiring 401 and the signal line 201. Another conceivable example is to provide a signal line 501 extending in a predetermined direction on the second chip 5 instead of the first chip 1, as illustrated in FIG. 5. In this case, the pixel 11 and the MPX circuit 350(A) can also be connected to each other. However, it is desirable to provide the signal line extending in the predetermined direction on the first chip 1 as illustrated in FIG. 4 compared to FIG. 5. This is due to a larger number of wiring layers mounted on the second chip 5 including the signal processing circuits 21 than on the first chip 1 including the pixels 11. The former layout is desirable because higher design flexibility can be acquired by providing the signal line 201 to the first chip 1 including the smaller number of wiring layers as illustrated in FIG. 4 than providing the signal line 501 to the second chip 5 including the larger number of wiring layers as illustrated in FIG. 5. Typically, the connection wiring 401 and the connection wiring 405 are each formed as a via.

(Equivalent Circuit of Pixel)

Figure 6:
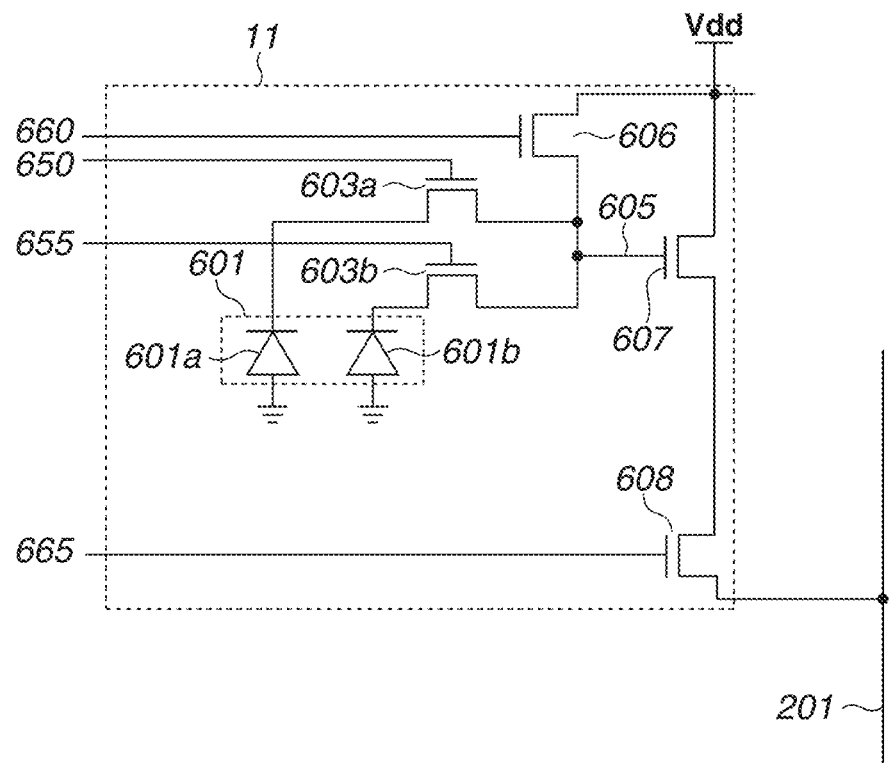
FIG. 6 is a diagram illustrating an equivalent circuit of the pixel.

FIG. 6 is an equivalent circuit diagram of the pixel 11 according to the present exemplary embodiment. The pixel 11 includes photodiodes 601*a* and 601*b*, which are the photoelectric conversion unit. Light is incident on the photodiodes 601 and 601*b* after being transmitted through not-illustrated one microlens and the color filter provided according to the layout illustrated in FIG. 2. In other words, a wavelength of the light is substantially the same between the light incident on the photodiode 601*a* and the light incident on the photodiode 601*b*.

The photodiode 601*a* is connected to a floating diffusion unit (hereinafter referred to as an FD unit) 605 via a transfer transistor 603*a*. Further, a gate of the transfer transistor 603*a* is connected to the not-illustrated vertical scanning circuit via a control line 650.

The photodiode 601*b* is connected to the floating diffusion unit (hereinafter referred to as the FD unit) 605 via a transfer transistor 603*b*. Further, a gate of the transfer transistor 603*b* is connected to the not-illustrated vertical scanning circuit via a control line 655.

The FD unit 605 is connected to a gate of an amplification transistor 607 and a reset transistor 606.

A power source voltage Vdd is supplied to the reset transistor 606 and the amplification transistor 607. A gate of the reset transistor 606 is connected to the not-illustrated vertical scanning circuit via a control line 660.

The amplification transistor 607 is connected to a selection transistor 608. A gate of the selection transistor 608 is connected to the not-illustrated vertical scanning circuit via a control line 665.

The selection transistor 608 is connected to the signal line 201.

(Operation of Imaging Apparatus)

Figure 7:
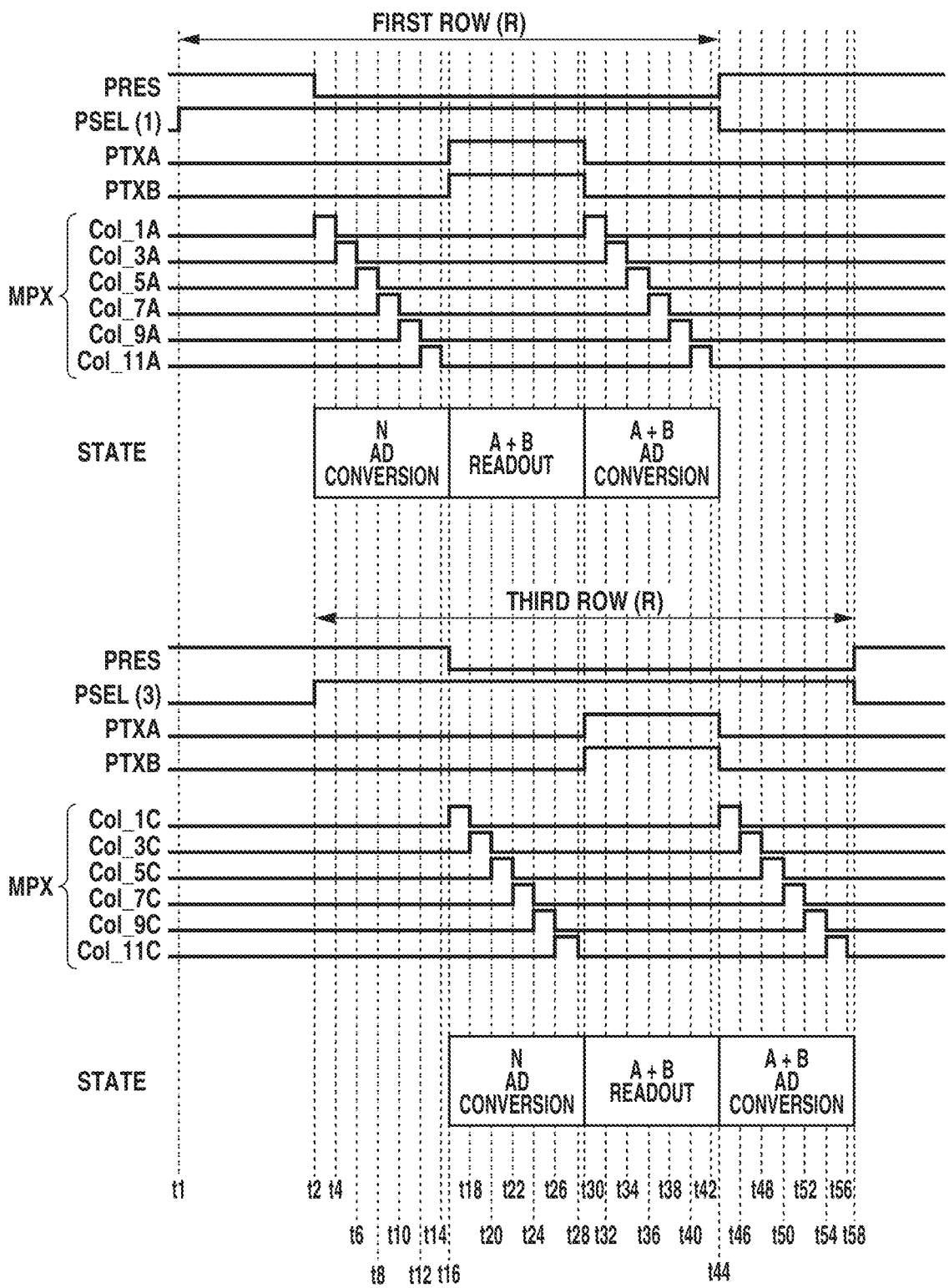
FIG. 7 is a diagram illustrating an operation of the imaging apparatus.

FIG. 7 illustrates an operation of the imaging apparatus including the pixel 11 illustrated in FIG. 6.

A signal PRES illustrated in FIG. 7 indicates a signal supplied from the vertical scanning circuit to the gate of the reset transistor 606 via the control line 660 illustrated in FIG. 6. Similarly, a signal PSEL indicates a signal supplied from the vertical scanning circuit to the gate of the selection transistor 608 of the pixel 11 in the N-th row via the control line 665. Regarding the signal PSEL, a row position of the pixel 11 to which the signal PSEL is output is indicated at the end of this reference numeral together therewith. In other words, a signal PSEL(1) indicates that this signal is the signal PSEL output to the pixel 11 in the first row. A signal PTXA indicates a signal supplied from the vertical scanning circuit to the gate of the transfer transistor 603*a* via the control line 650. A signal PTXB indicates a signal supplied from the vertical scanning circuit to the gate of the transfer transistor 603*b* via the control line 655.

FIG. 7 illustrates an operation regarding the MPX circuit 350(A) and the ADC 360(A). Signals input to these MPX circuit 350(A) and ADC 360(A) are signals of the pixels 11 each including the R color filter and located in the first and third rows and the odd-numbered columns among the first to twelfth columns, as illustrated in FIG. 3. Therefore, FIG. 7 illustrates an operation regarding operations of the pixels 11 located in the first and third rows and the odd-numbered columns among the first to twelfth columns.

Further, a signal MPX illustrated in FIG. 7 indicates a signal that the not-illustrated timing generator outputs to the MPX circuit 350(A). According to a change in a signal value of the signal MPX, the MPX circuit 350(A) sequentially changes the signal to output to the ADC 360(A) by selecting it from the signal lines 201 corresponding to the pixels 11 in the odd-numbered columns among the first to twelfth columns.

In FIG. 7, Col_nm is used to indicate which column is selected by the MPX circuit 305(A) as the column from which the signal is output to the ADC 360(A). What is represented by this nm will be described now. The alphabet n represents a column number of the pixel 11. Further, m represents an alphabet of the signal lines 201(A) to (D) disposed in correspondence with the pixels 11 in one column. In other words, Col_1A indicates the signal line 201(A) corresponding to the pixel 11 in the first column.

At time t1, the vertical scanning circuit sets the signal PRES to output to each of the pixels 11 in the first and third rows to a High level. Due to this setting, the reset transistor 606 of each of the pixels 11 in the first row is switched on. Therefore, the FD unit 605 is reset to a potential corresponding to the power source voltage Vdd. Further, at time t1, the vertical scanning circuit sets the signal PSEL(1) to the High level. Due to this setting, the selection transistor 608 of each of the pixels 11 in the first row is switched on. Therefore, the current supplied by the current source 310 illustrated in FIG. 3 is supplied to the amplification transistor 607 via the selection transistor 608 of each of the pixels 11 in the first row. Due to this supply, a source follower circuit is formed by the power source voltage Vdd, the amplification transistor 607, and the current source 310. In other words, the amplification transistor 607 performs a source follower operation of outputting a signal corresponding to a potential of the FD unit 605 to the signal line 201 via the selection transistor 608.

(Operation: Readout of N Signals Corresponding to Pixels 11 in First Row)

At time t2, the vertical scanning circuit sets the signal PRES to output to each of the pixels 11 in the first row to a Low level. Due to this setting, the reset transistor 606 of each of the pixels 11 in the first row is switched off. Therefore, the reset of the FD unit 605 is cleared. The amplification transistor 607 outputs the signal based on the potential of the FD unit 605, the reset of which is cleared, to the signal line 201(A) illustrated in FIG. 3. This signal will be referred to as an N signal (a noise signal). Due to this output, the N signal is output from the pixel 11 to the signal line 201(A) corresponding to each of the columns.

(Operation: AD Conversion of N Signals Corresponding to Pixels 11 in First Row)

After time t2, the MPX circuit 350(A) sequentially connects the signal lines 201(A) corresponding to the pixels 11 in the odd-numbered columns among the first to twelfth columns to the ADC 360(A) according to the signal MPX supplied from the timing generator.

The ADC 360(A) carries out the AD conversion to convert the noise signal of the signal line 201(A) corresponding to the first column that is output from the MPX circuit 350(A) into a digital signal. After that, the ADC 360(A) carries out the AD conversion to sequentially convert the noise signals output to the signal lines 201(A) corresponding to the pixels 11 in the odd-numbered columns among the first to twelfth columns into digital signals.

(Operation: Readout of N Signals Corresponding to Pixels 11 in Third Row)

At time t16, the vertical scanning circuit sets the signal to output to each of the pixels 11 in the third row to the Low level. Due to this setting, the reset transistor 606 of each of the pixels 11 in the third row is switched off. Therefore, the reset of the FD unit 605 is cleared. The amplification transistor 607 outputs the N signal that is the signal based on the potential of the FD unit 605, the reset of which is cleared, to the signal line 201(C) illustrated in FIG. 3. Due to this output, the noise signal is output from the pixel 11 to the signal line 201(C) corresponding to each of the columns.

(Operation: AD Conversion of N Signals Corresponding to Pixels 11 in Third Row)

After time t16, the MPX circuit 350(A) sequentially connects the signal lines 201(C) corresponding to the pixels 11 in the odd-numbered columns among the first to twelfth columns to the ADC 360(A) according to the signal MPX supplied from the timing generator.

The ADC 360(A) carries out the AD conversion to convert the N signal of the signal line 201(C) corresponding to the first column that is output from the MPX circuit 350(A) into a digital signal. After that, the ADC 360(A) carries out the AD conversion to sequentially convert the N signals output to the signal lines 201(C) corresponding to the pixels 11 in the odd-numbered columns among the first to twelfth columns into digital signals.

(Operation: Readout of A+B Signals Corresponding to Pixels 11 in First Row)

At time t16, the vertical scanning circuit sets the signals PTXA and PTXB to output to each of the pixels 11 in the first row to the High levels. Due to this setting, charges (electrons in the present exemplary embodiment) accumulated by the photodiodes 601a and 601b are transferred to the FD unit 605 via the transfer transistors 603a and 603b, respectively. The respective charges of the photodiodes 601a and 601b are added at the FD unit 605. Due to this addition, the FD unit 605 has a potential corresponding to a charge resulting from the addition of the respective charges of the photodiodes 601a and 601b. Suppose that an A signal is defined to refer to a signal output by the amplification transistor 607 based on a potential of the FD unit 605 derived from the charge of only the photodiode 601a. Further, suppose that a B signal is defined to refer to a signal output by the amplification transistor 607 based on a potential of the FD unit 605 derived from the charge of only the photodiode 601b. According to this definition, a signal output by the amplification transistor 607 based on the potential of the FD unit 605 corresponding to the charge resulting from the addition of the respective charges of the photodiodes 601a and 601b can be regarded as an A+B signal, which is a sum of the A signal and the B signal. The A+B signal of the pixel 11 in the first row is output to the signal line 201(A) corresponding to each of the columns.

(Operation: AD conversion of A+B Signals Corresponding to Pixels 11 in First Row)

After time t30, the MPX circuit 350(A) sequentially connects the signal lines 201(A) corresponding to the pixels 11 in the odd-numbered columns among the first to twelfth columns to the ADC 360(A) according to the signal MPX supplied from the timing generator.

The ADC 360(A) carries out the AD conversion to convert the A+B signal of the signal line 201(A) corresponding to the first column that is output from the MPX circuit 350(A) into a digital signal. After that, the ADC 360(A) carries out the AD conversion to sequentially convert the A+B signals output to the signal lines 201(A) corresponding to the pixels 11 in the odd-numbered columns among the first to twelfth columns into digital signals.

(Operation: Readout of A+B Signals Corresponding to Pixels 11 in Third Row)

At time t30, the vertical scanning circuit sets the signals PTXA and PTXB to output to each of the pixels 11 in the third row to the High levels. Due to this setting, the A+B signal of the pixel 11 in the third row is output to the signal line 201(C) corresponding to each of the columns.

(Operation: AD Conversion of A+B Signals Corresponding to Pixels 11 in Third Row)

After time t44, the MPX circuit 350(A) sequentially connects the signal lines 201(C) corresponding to the pixels 11 in the odd-numbered columns among the first to twelfth columns to the ADC 360(A) according to the signal MPX supplied from the timing generator.

The ADC 360(A) carries out the AD conversion to convert the A+B signal of the signal line 201(C) corresponding to the first column that is output from the MPX circuit 350(A) into a digital signal. After that, the ADC 360(A) carries out the AD conversion to sequentially convert the A+B signals output to the signal lines 201(C) corresponding to the pixels 11 in the odd-numbered columns among the first to twelfth columns into digital signals.

(Parallel Operations Performed by Imaging Apparatus)

In the operation illustrated in FIG. 7, a plurality of operations is performed in parallel in the following manner.

(1) Parallel operations of the AD conversion of the N signals corresponding to the pixels 11 in the first row and the readout of the N signals corresponding to the pixels 11 in the third row.

(2) Parallel operations of the AD conversion of the N signals corresponding to the pixels 11 in the third row and the readout of the A+B signals corresponding to the pixels 11 in the first row.

(3) Parallel operations of the AD conversion of the A+B signals corresponding to the pixels 11 in the first row and the readout of the A+B signals corresponding to the pixels 11 in the third row.

By these parallel operations, the imaging apparatus can reduce a waiting time period between the end of one AD conversion by the ADC 360(A) and the next AD conversion by the ADC 360(A). By this reduction, the imaging apparatus can reduce a time period required for the AD conversions of the signals output by all of the pixels 11. Therefore, the imaging apparatus can promote an increase in a frame rate thereof.

Advantageous Effect of Present Exemplary Embodiment

In the imaging apparatus according to the present exemplary embodiment, all of the pixels 11 connected to one ADC 360(A) are the pixels 11 each including the R color filter as described above. On the other hand, all of the pixels 11 connected to the ADC 360(B) are the pixels 11 each including the G color filter. In this manner, the plurality of first pixels 11 each including the color filter of the first color (R) is connected to the ADC 360(A), which is the first AD conversion unit, without being connected to the ADC 360 (B), which is the second AD conversion unit. Further, the plurality of second pixels 11 each including the color filter of the second color (G) is connected to the ADC 360(B), which is the second AD conversion unit, without being connected to the ADC 360(A), which is the first AD conversion unit.

By being configured in this manner, the imaging apparatus can limit the color of the light corresponding to the signal on which one ADC carries out the AD conversion to only one color. The imaging apparatus including the plurality of ADCs may be required to perform processing for correcting the AD conversion or correction processing after the AD conversion to solve a variation in an AD conversion characteristic for each ADC. Examples of the processing for correcting the AD conversion include a correction of a reference signal used by the ADC. Further, examples of the correction processing after the AD conversion include a correction of the digital signal. If being configured to require one ADC to carry out the AD conversions on signals corresponding to light beams of a plurality of colors, the imaging apparatus may have to prepare a correction parameter according to each of the plurality of colors. Thus, this configuration involves such a problem that the correction of the AD conversion or the correction after the AD conversion becomes cumbersome.

On the other hand, the imaging apparatus according to the present exemplary embodiment limits the color of the light corresponding to the signal on which one ADC carries out the AD conversion to only one color. By this configuration, the imaging apparatus according to the present exemplary embodiment brings about an advantageous effect of being able to simplify the correction of the AD conversion or the correction after the AD conversion.

In this manner, the imaging apparatus according to the present exemplary embodiment can provide the imaging apparatus having the beneficial connection relationship between the pixels and the AD conversion units in the case where the color filter of the first color is disposed on the plurality of first pixels and the color filter of the second color is disposed on the plurality of second pixels.

In the present exemplary embodiment, the imaging apparatus has been described, referring to the example in which the signal line 201 to which the pixel 11 equipped with the color filter of the first color is connected and the pixel 11 equipped with the color filter of the second color is not connected is connected to the ADC 360. In this example, the imaging apparatus is configured to lack a connection portion for connecting the ADC 360 and the pixel 11 equipped with the color filter of the second color.

Figure 8:
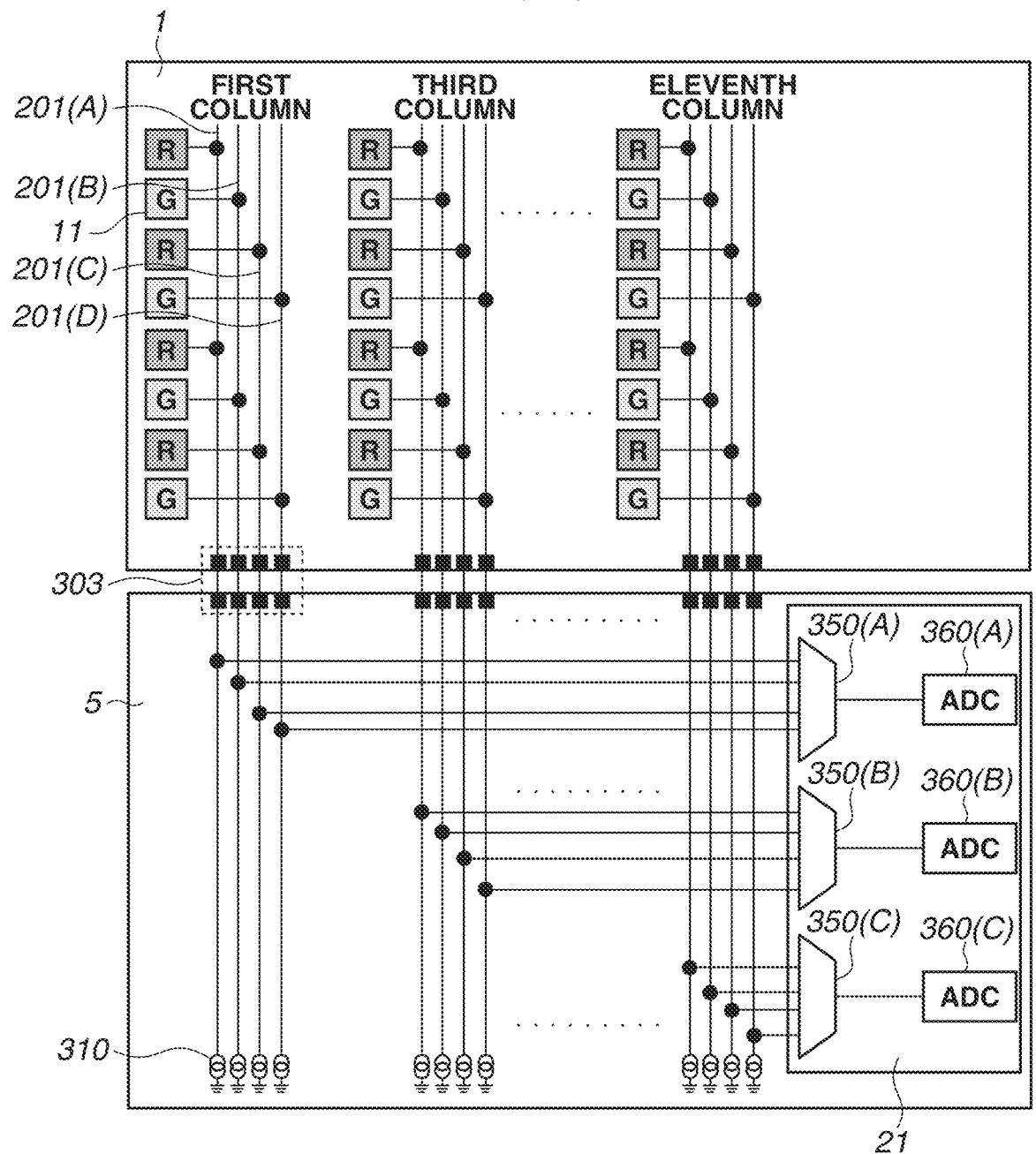
FIG. 8 is a diagram illustrating connections between the pixels and the signal processing circuits.

The present disclosure is not limited to this example. For example, the present exemplary embodiment can also be applied to an example in which a plurality of signal lines is disposed for the pixels 11 in one column, and this plurality of signal lines is selectively connected to the ADC 360 by the MPX circuit 350, as illustrated in FIG. 8. In the case of this example, a similar result can be achieved by causing the ADC 360 to be connected to the pixel 11 equipped with the color filter of the first color while prohibiting the ADC 360 from being connected to the pixel 11 equipped with the color filter of the second color during a time period of one frame.

This example will be described now, focusing on the pixel 11 in the first column. The MPX circuit 350(A) connects, to the ADC 360(A), the signal lines 201(A) and 201(C) to which the pixels 11 each equipped with the color filter of R, which is the first color, are connected. On the other hand, during a time period of this one frame, the MPX circuit 350(A) does not connect, to the ADC 360(A), the signal lines 201(B) and 201(D) to which the pixels 11 each equipped with the color filter of G, which is the second color, are connected. This configuration can also bring about the above-described advantageous effect of being able to simplify the correction of the AD conversion or the correction after the AD conversion.

A second exemplary embodiment will be described, focusing on differences from the first exemplary embodiment. An imaging apparatus according to the present exemplary embodiment is an example in which a successive-approximation type AD converter is used as each of the ADC 360(A) and the ADC 360(B) according to the first exemplary embodiment. The imaging apparatus according to the present exemplary embodiment can be configured in a similar manner to the imaging apparatus according to the first exemplary embodiment in terms of the other configuration. (Equivalent Circuit of Successive-Approximation Type ADC)

Figure 9:
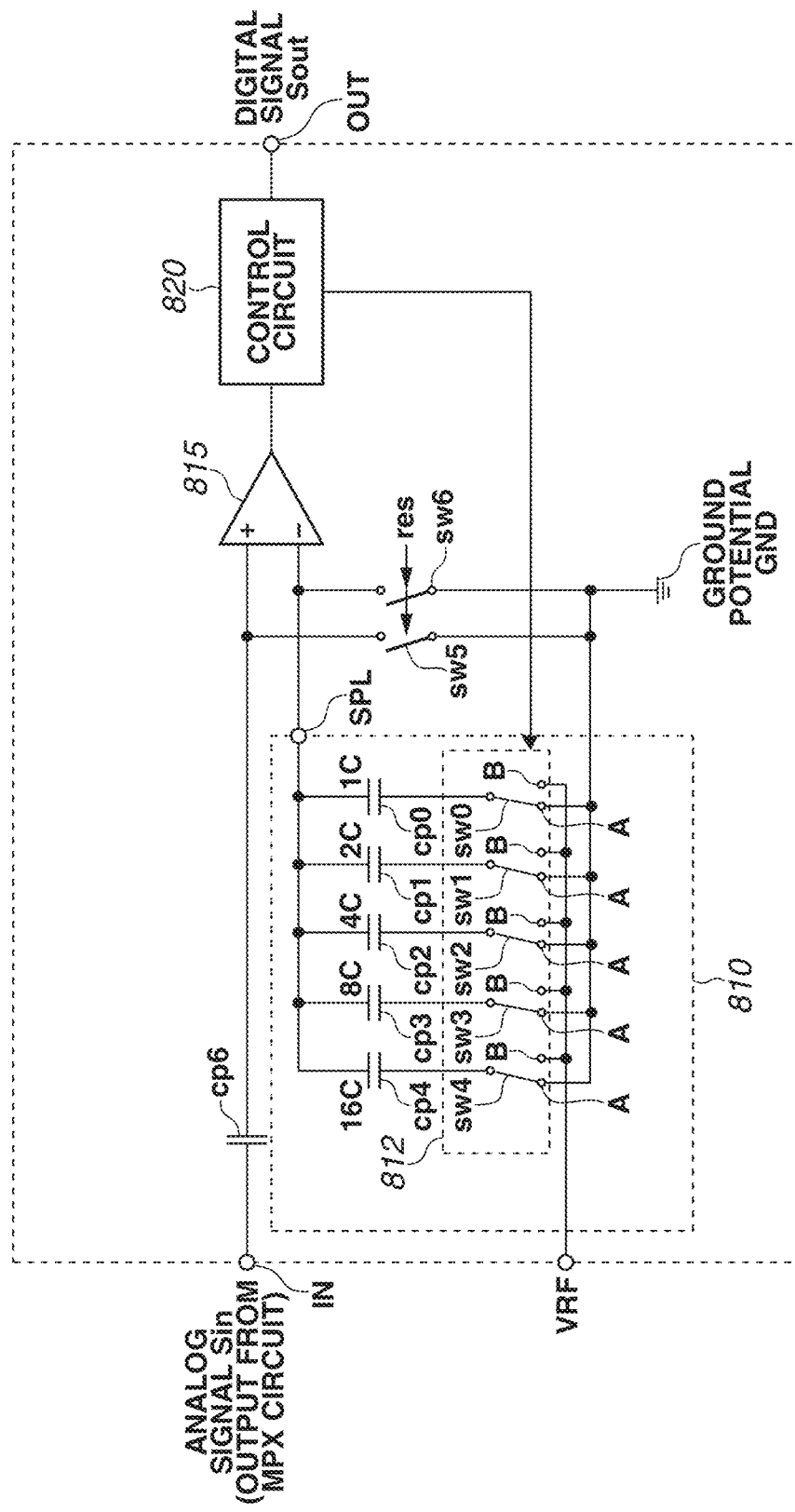
FIG. 9 is a diagram illustrating an equivalent circuit of an analog-to-digital (AD) conversion circuit.

FIG. 9 is an equivalent circuit diagram of an ADC 360 according to the present exemplary embodiment.

The ADC 360 includes an input terminal IN and an output terminal OUT, and converts an analog signal Sin input from the input terminal IN (the output from the MPX circuit 350) into a digital signal Sout and outputs this signal from the output terminal OUT. This analog signal Sin can correspond to one or both of the N signal and the S signal described in the first exemplary embodiment. The ADC 360 converts the output from the MPX circuit into the digital signal Sout at a resolution of five bits.

The ADC 360 further includes a generation circuit 810 that generates a comparison signal for use in a comparison with the analog signal Sin. The generation circuit 810 includes a plurality of capacitor elements cp0 to cp4 having capacitance values according to a binary weight, and a plurality of switches sw0 to sw4 respectively connected to the capacitor elements cp0 to cp4. A switching circuit that selects one or more of the capacitor elements cp0 to cp4 is formed by the plurality of switches sw0 to sw4. The binary weight refers to a set of weights (capacitance values) that forms an arithmetic progression having a common ratio of 2. In the example illustrated in FIG. 9, the capacitor elements cp0 to cp4 have capacitance values of 1 C, 2 C, 4 C, 8 C, and 16 C in this order. One electrode of each of the capacitor elements cp0 to cp4 is connected to a supply terminal SPL of the generation circuit 810, and the other electrode of each of the capacitor elements cp0 to cp4 is connected to the switches sw0 to sw4, respectively. Each of the switches sw0 to sw4 have one end connected to the capacitor elements cp0 to cp4, respectively, and each of the other ends toggles between a terminal A and a terminal B. A ground potential GND is supplied to the terminal A, and a reference voltage VRF is supplied to the terminal B. The reference voltage VRF is a constant voltage supplied from outside the ADC 360, and is a value larger than the ground potential GND. The ground potential GND is supplied to the capacitor element cp0 when the switch sw0 is toggled to the terminal A, and the reference voltage VRF is supplied to the capacitor element cp0 when the switch sw0 is toggled to the terminal B. The same also applies to the other switches sw1 to sw4. Switching the switches sw0 to sw4 causes a change in a combined capacitance value of the capacitor elements connected between the supply terminal SPL and the reference voltage VRF, thereby leading to a change in a value of a comparison signal Vcmp output from the supply terminal SPL as a result thereof.

The ADC 360 further includes a comparator 815. The comparator 815 compares the value of the analog signal Sin and the value of the comparison signal Vcmp, and outputs a signal according to a result of the comparison. The analog signal Sin is supplied to a non-inversion terminal of the comparator 815 via a capacitor element cp6, and the comparison signal Vcmp is supplied from the supply terminal SPL of the generation circuit 810 to an inversion terminal of the comparator 815. Due to this supply, High is output when the value of the analog signal Sin is equal to or larger than the value of the comparison signal Vcmp, and Low is output when the value of the analog signal Sin is smaller than the value of the comparison signal Vcmp. In this example, High is output when the value of the analog signal Sin and the value of the comparison signal Vcmp are equal to each other, but Low may be output in this case. The capacitor element cp6 adjusts the value of the analog signal Sin to a range comparable with the comparison signal Vcmp. In the present exemplary embodiment, for simplicity of the description, the ADC 360 will be described, assuming that the value of the analog signal Sin is equal to or larger than the ground potential GND and equal to or smaller than the reference voltage VRF, and a signal having a value equal to the analog signal Sin is supplied to the non-inversion terminal of the comparator 815.

The analog signal Sin is supplied to the non-inversion terminal of the comparator 815 and the comparison signal Vcmp is supplied to the inversion terminal of the comparator 815 in the example illustrated in FIG. 9, but another configuration can be employed as long as a relationship about which value is larger between the value of the analog signal Sin and the value of the comparison signal Vcmp can be determined. For example, the imaging apparatus may be configured to supply a difference between the analog signal Sin and the comparison signal Vcmp to the non-inversion terminal of the comparator 815, and supply the ground potential GND to the inversion terminal of the comparator 815.

The ADC 360 further includes switches sw5 and sw6. When these switches sw5 and sw6 are brought into conductive states, the ground potential GND is supplied to the non-inversion terminal and the inversion terminal of the comparator 815, and the comparator 815 is reset.

The ADC 360 further includes a control circuit 820. The comparison result is supplied from the comparator 815 to the control circuit 820, and the control circuit 820 generates the digital signal Sout based on this comparison result and outputs the digital signal Sout from the output terminal OUT. The control circuit 820 also transmits a control signal to each of the switches sw0 to sw6 to switch a state thereof. The ADC 360(A) includes the comparator 815 and the generation circuit 810 different from the comparator 815 and the generation circuit 810 of the ADC 360(B). It can be said that the first AD conversion unit and the second AD conversion unit include different comparators and different generation circuits from each other.

(Operation of Successive-Approximation Type ADC)

Figure 10:
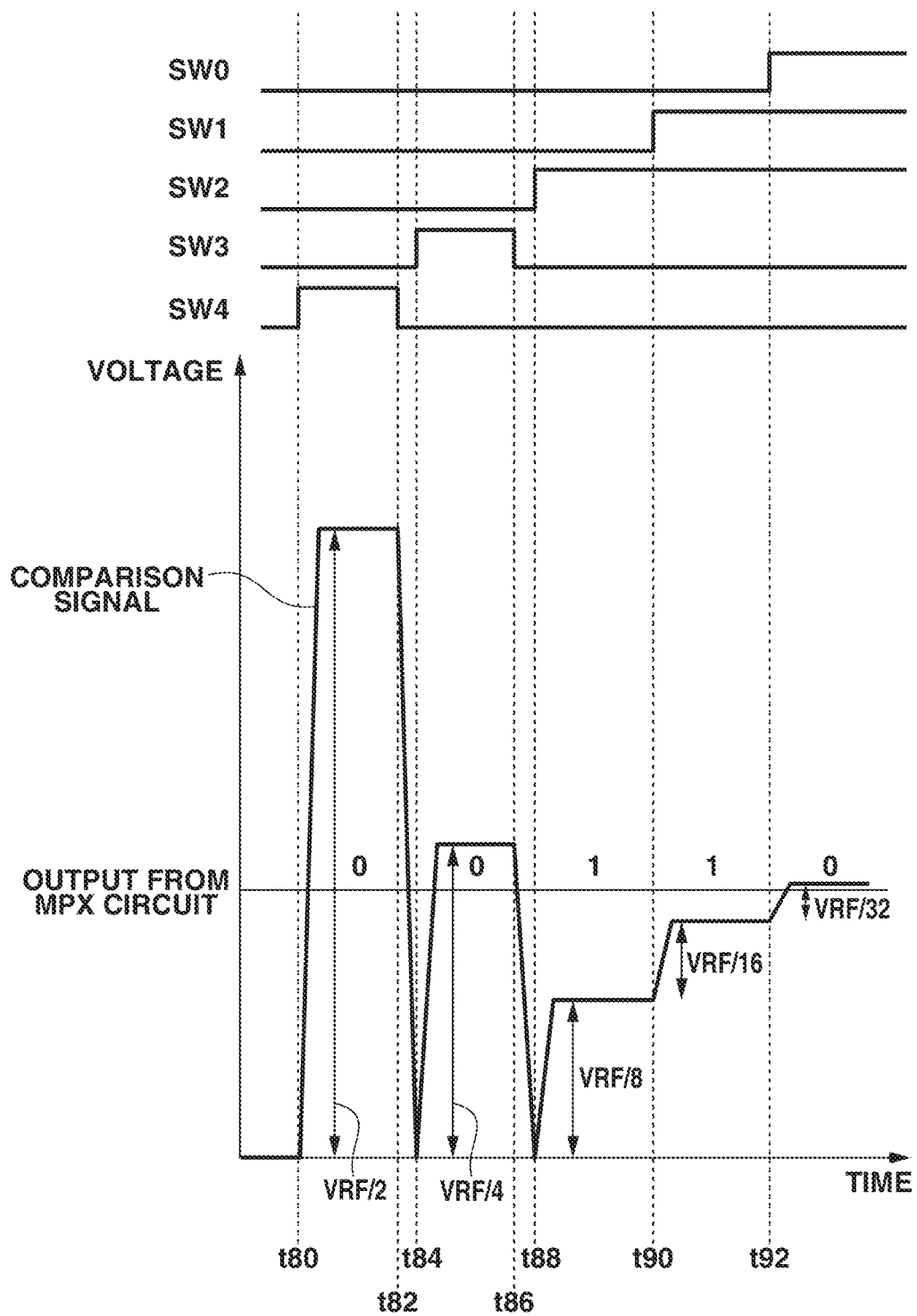
FIG. 10 is a diagram illustrating an operation of the AD conversion circuit.

In FIG. 10, sw0 to sw6 represent values of the control signals supplied from the control circuit 820 to the switches sw0 to sw6, respectively. The switches sw0 to sw4 are each toggled to the terminal B when the supplied control signal is High and to terminal A when the control signal is Low. The switches sw5 and sw6 are each brought into the conductive state when the supplied control signal is High and into a non-conductive state when the control signal is Low. The analog signal Sin and the comparison signal Vcmp are illustrated on a lower side of FIG. 10. FIG. 10 illustrates the operation assuming that the value of the analog signal Sin corresponds to 00110 in binary form by way of example.

Subsequently, an AD conversion operation of the AD converter 360 will be described chronologically. The control circuit 820 sets the control signal to be supplied to each of the switches sw0 to sw4 to Low, and the control signal to be supplied to each of the switches sw5 and sw6 to High during a preparation time period. Due to this setting, the non-inversion terminal and the inversion terminal of the comparator 815 are reset to the ground potential GND, and the value of the comparison signal Vcmp also becomes equal to the ground potential GND. After that, the control circuit 820 sets the control signal to be supplied to each of the switches sw5 and sw6 to Low. In an operation after that, the analog signal Sin continues to be supplied to the non-inversion terminal of the comparator 815.

Next, upon start of a successive-approximation time period, the control circuit 820 changes the control signal to be supplied to the switch sw4 to High. Due to this change, the switch sw4 is toggled to the terminal B, and the reference voltage VRF is applied to the supply terminal SPL of the generation circuit 810 via the capacitor cp4 having the largest capacitance value in the binary weight. As a result thereof, the comparison signal Vcmp increases by VRF/2, and the value of the comparison signal Vcmp becomes equal to VRF/2. The control circuit 820 determines that the value of the analog signal Sin is smaller than the value of the comparison signal Vcmp (VRF/2) based on the comparison result from the comparator 815, and returns the control signal to be supplied to the switch sw4 to Low. Due to this return, the value of the comparison signal Vcmp returns to the ground potential GND. This comparison result means that 0 is placed at the most significant bit (MSB) (the fifth bit when the least significant bit (LSB) is assumed to be the first bit) of the value of the digital signal Sout.

Next, the control circuit 820 changes the control signal to be supplied to the switch sw3 to High. Due to this change, the reference voltage VRF is applied to the supply terminal SPL of the generation circuit 810 via the capacitor cp3 having the second largest capacitance value in the binary weight. As a result thereof, the comparison signal Vcmp increases by VRF/4, and the value of the comparison signal Vcmp becomes equal to VRF/4. The control circuit 820 determines that the value of the analog signal Sin is smaller than the value of the comparison signal Vcmp (VRF/4) based on the comparison result from the comparator 815, and returns the control signal to be supplied to the switch sw3 to Low. Due to this return, the value of the comparison signal Vcmp returns to the ground potential GND. This comparison result means that 0 is placed at the fourth bit of the value of the digital signal Sout.

Next, the control circuit 820 changes the control signal to be supplied to the switch sw2 to High. Due to this change, the reference voltage VRF is applied to the supply terminal SPL of the generation circuit 810 via the capacitor cp2 having the third largest capacitance value in the binary weight. As a result thereof, the comparison signal Vcmp increases by VRF/8, and the value of the comparison signal Vcmp becomes equal to VRF/8. The control circuit 820 determines that the value of the analog signal Sin is larger than the value of the comparison signal Vcmp (VRF/8) based on the comparison result from the comparator 815, and maintains the control signal to be supplied to the switch sw2 set to High. Due to this control, the value of the comparison signal Vcmp is maintained at VRF/8. This comparison result means that 1 is placed at the third bit of the value of the digital signal Sout.

Next, the control circuit 820 changes the control signal to be supplied to the switch sw1 to High. Due to this change, the reference voltage VRF is applied to the supply terminal SPL of the generation circuit 810 via the capacitor cp1 having the fourth largest capacitance value in the binary weight and the capacitor cp2. As a result thereof, the comparison signal Vcmp increases by VRF/16, and the value of the comparison signal Vcmp becomes equal to VRF*3/16. The symbol "*" used in the present specification represents multiplication. The control circuit 820 determines that the value of the analog signal Sin is larger than the value of the comparison signal Vcmp (VRF*3/16) based on the comparison result from the comparator 815, and maintains the control signal to be supplied to the switch sw1 set to High. Due to this control, the value of the comparison signal Vcmp is maintained at VRF*3/16. This comparison result means that 1 is placed at the second bit of the value of the digital signal Sout.

Lastly, the control circuit 820 changes the control signal to be supplied to the switch sw0 to High. Due to this change, the reference voltage VRF is applied to the supply terminal SPL of the generation circuit 810 via the capacitor cp0 having the fifth largest capacitance value in the binary weight, cp1, and cp2. As a result thereof, the comparison signal Vcmp increases by VRF/32, and the value of the comparison signal Vcmp becomes equal to VRF*7/32. The control circuit 820 determines that the value of the analog signal Sin is smaller than the value of the comparison signal Vcmp (VRF*7/32) based on the comparison result from the comparator 815, and returns the control signal to be supplied to the switch sw0 to Low. Due to this return, the value of the comparison signal Vcmp returns to VRF*3/16. This comparison result means that 0 is placed at the first bit of the value of the digital signal Sout.

By this successive approximation, the control circuit 820 determines that the digital signal Sout corresponding to the analog signal Sin is 00110.

In this manner, the ADC 360 can carry out the AD conversion for generating the digital signal corresponding to the input analog signal.

(Other AD Conversion Methods)

In the second exemplary embodiment, the example using the successive-approximation type AD converter as the ADC 360 has been described. The ADC 360 is not limited to this successive-approximation type AD converter. Various AD converters, such as a ramp-compare AD converter, a delta-sigma AD converter, a pipelined AD converter, and a flash AD converter, can be used as other AD converters.

FIG. 11 is a block diagram illustrating a configuration of an imaging system 500 according to a third exemplary embodiment. The imaging system 500 according to the present exemplary embodiment includes an imaging apparatus 200 to which any of the configurations of the imaging apparatuses described in the above-described individual exemplary embodiments is applied. Specific examples of the imaging system 500 include a digital still camera, a digital camcorder, and a monitoring camera. FIG. 11 illustrates an example of a configuration of the digital still camera to which any of the imaging apparatuses according to the above-described individual exemplary embodiments is applied as the imaging apparatus 200.

The imaging system 500 exemplified in FIG. 11 includes the imaging apparatus 200, a lens 5020 that forms an optical image of a subject on the imaging apparatus 200, a diaphragm 504 for making a light amount transmitted through the lens 5020 variable, and a barrier 506 for protecting the lens 5020. The lens 5020 and the diaphragm 504 are an optical system that collects the light onto the imaging apparatus 200.

The imaging system 500 further includes a signal processing unit 5080 that processes an output signal output from the imaging apparatus 200. The signal processing unit 5080 performs a signal processing operation of correcting and/or compressing the input signal in various manners and outputting a resultant signal as necessary. The signal processing unit 5080 may have a function of performing the AD conversion processing on the output signal output from the imaging apparatus 200. In this case, the AD conversion circuit does not necessarily have to be provided inside the imaging apparatus 200.

The imaging system 500 further includes a buffer memory unit 510 for temporarily storing image data, and an external interface unit (an external I/F unit) 512 for communicating with an external computer and the like. The imaging system 500 further includes a recording medium 514 such as a semiconductor memory for recording or reading out the data of the captured image, and a recording medium control interface unit (a recording medium control I/F unit) 516 for allowing the data of the captured image to be recorded into or read out from the recording medium 514. The recording medium 514 may be built in the imaging system 500 or may be detachably mounted.

The imaging system 500 further includes an overall control/calculation unit 518 that controls the entire digital still camera along with carrying out various kinds of calculations, and a timing generation unit 520 that outputs various kinds of timing signals to the imaging apparatus 200 and the signal processing unit 5080. The timing signal and the like may be input from outside the imaging system 500, and the imaging system 500 may be configured in a different manner as long as the imaging system 500 includes at least the imaging apparatus 200, and the signal processing unit 5080 that processes the output signal output from the imaging apparatus 200. The overall control/calculation unit 518 and the timing generation unit 520 may be configured to partially or entirely perform the function of controlling the imaging apparatus 200.

The imaging apparatus 200 outputs the image signal to the signal processing unit 5080. The signal processing unit 5080 performs predetermined signal processing on the image signal output from the imaging apparatus 200, and outputs the image data. Further, the signal processing unit 5080 generates the image by using the image signal.

An imaging system capable of acquiring a further high-quality image can be realized by constructing the imaging system with use of the imaging apparatus according to each of the above-described exemplary embodiments.

An imaging system and a moving object according to a fourth exemplary embodiment will be described with reference to FIGS. 12A and 12B, and 13.

Figure 12A:
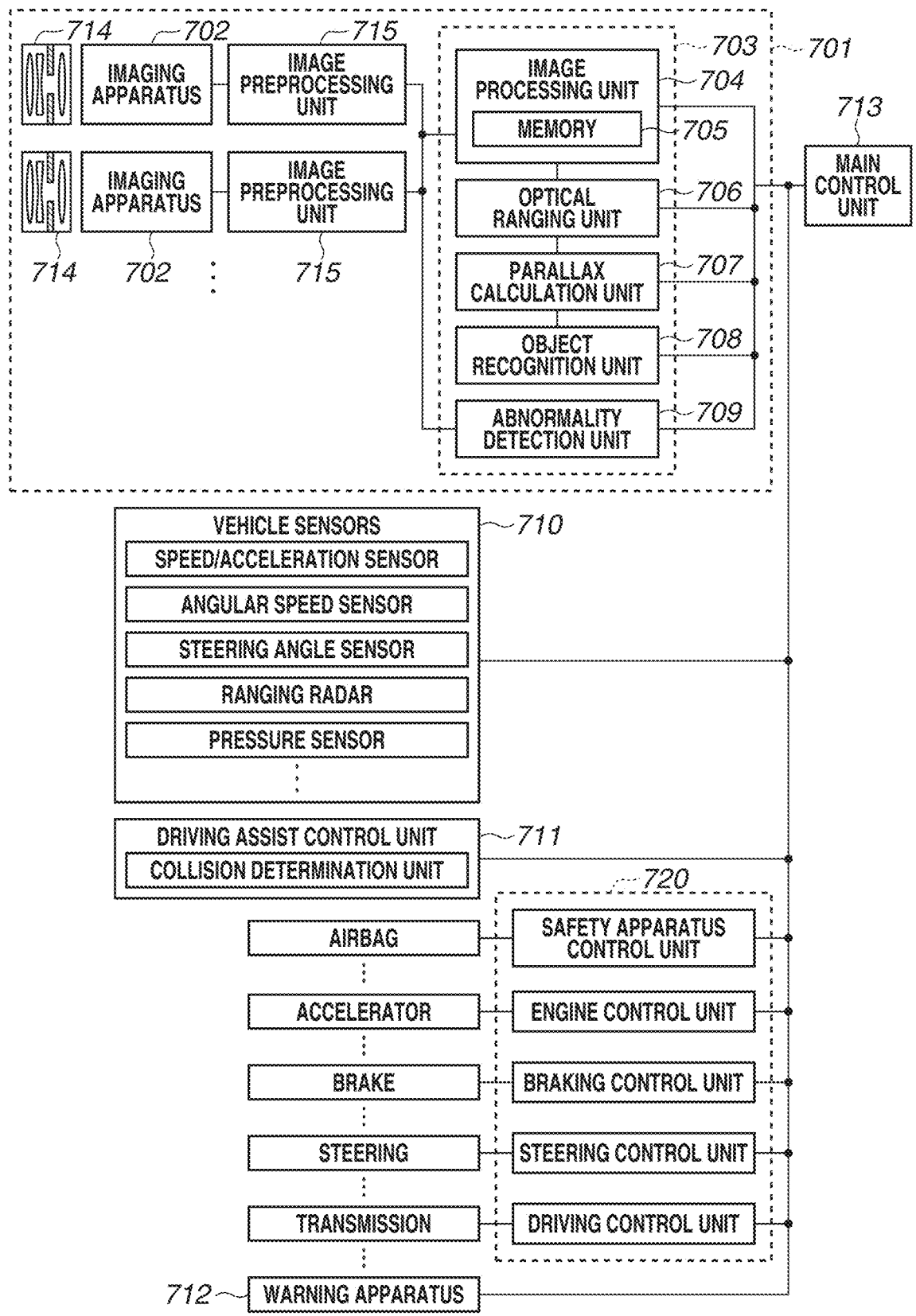
Figure 13:
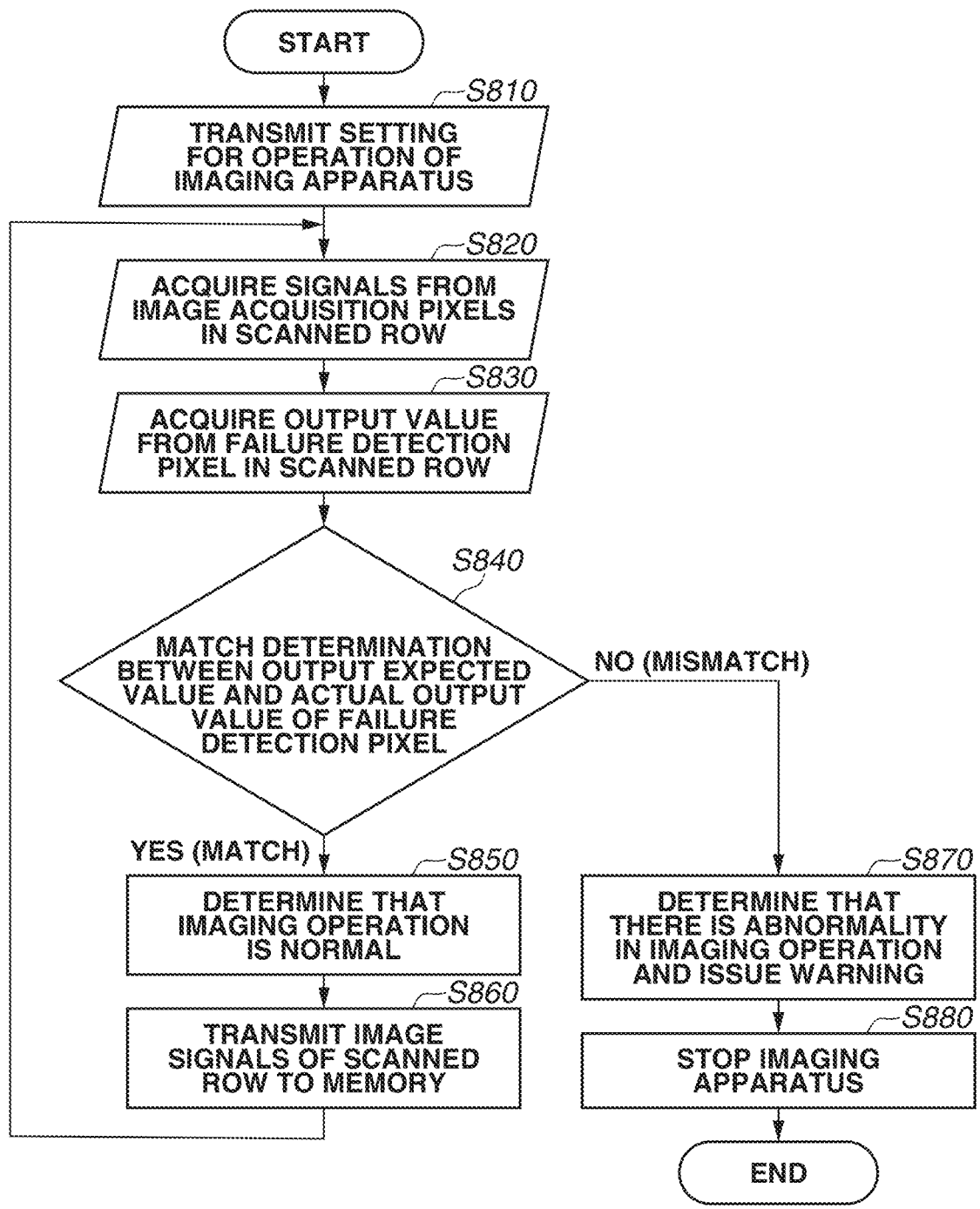
FIG. 13 is a flowchart illustrating an operation of an imaging system.

FIGS. 12A and 12B are schematic views illustrating an example of a configuration of the imaging system and the moving object according to the present exemplary embodiment. FIG. 13 is a flowchart illustrating an operation of the imaging system according to the present exemplary embodiment.

The present exemplary embodiment illustrates an example of an imaging system regarding an in-vehicle camera. FIGS. 12A and 12B illustrate one example of a vehicle system and an imaging system mounted thereon. An imaging system 701 includes an imaging apparatus 702, an image preprocessing unit 715, an integrated circuit 703, and an optical system 714. The optical system 714 forms an optical image of a subject on the imaging apparatus 702. The imaging apparatus 702 converts the optical image of the subject formed by the optical system 714 into an electric signal. The imaging apparatus 702 is any of the imaging apparatuses according to the above-described exemplary embodiments. The image preprocessing unit 715 performs predetermined signal processing on the signal output from the imaging apparatus 702. The function of the image preprocessing unit 715 may be built in the imaging apparatus 702. The imaging system 701 includes at least two sets of optical systems 714, imaging apparatuses 702, and image preprocessing units 715, and is configured in such a manner that an output from the image preprocessing unit 715 in each of the sets is input to the integrated circuit 703.

The integrated circuit 703 is an integrated circuit intended to be used in an imaging system, and includes an image processing unit 704 including a memory 705, an optical ranging unit 706, a parallax calculation unit 707, an object recognition unit 708, and an abnormality detection unit 709. The image processing unit 704 performs image processing such as development processing and a defect correction on the output signal from each of the image preprocessing units 715. The memory 705 stores a captured image as primary storage, and stores a position at which a pixel in the captured image is defective. The optical ranging unit 706 focuses the imaging apparatuses 702 on the subject and measures a distance. The parallax calculation unit 707 calculates a parallax (a phase difference between parallax images) from a plurality of pieces of image data acquired by the plurality of imaging apparatuses 702. The object recognition unit 708 recognizes the subject, such as a vehicle, a road, a sign, and a person. Upon detecting abnormality in the imaging apparatus 702, the abnormality detection unit 709 notifies a main control unit 713 of the abnormality.

The integrated circuit 703 may be realized by hardware designed especially therefor, a software module, or by a combination thereof. Alternatively, the integrated circuit 703 may be realized by a field programmable gate array (FPGA), an application specific integrated circuit (ASIC), or the like, or may be realized by a combination of them.

The main control unit 713 supervises and controls operations of the imaging system 701, vehicle sensors 710, control units 720, and the like. Another employable method is that the main control unit 713 is omitted, and the imaging system 701, the vehicle sensors 710, and the control units 720 include respective individual communication interfaces and each transmits and receives a control signal via a communication network (for example, the Controller Area Network (CAN) standard).

The integrated circuit 703 has a function of transmitting a control signal and a setting value to each of the imaging apparatuses 702 by receiving a control signal from the main control unit 713 or by being controlled by its own control unit. For example, the integrated circuit 703 transmits a setting for causing pulse driving of a voltage switch 13 in the imaging apparatus 702, a setting for switching the voltage switch 13 for each frame, and the like.

The imaging system 701 is connected to the vehicle sensors 710, and can detect a running state of a vehicle on which the imaging system 701 is mounted, such as a vehicle speed, a yaw rate, and a steering angle, a state of an environment outside this vehicle, and a state of another vehicle/obstacle. The vehicle sensors 710 also serve as a distance information acquisition unit that acquires distance information between the vehicle and a target from the parallax images. Further, the imaging system 701 is connected to a driving assist control unit 711 that provides various driving assists, such as autonomous steering, autonomous cruising, and collision prevention functions. Especially, a collision determination function is used to determine prediction of a collision or presence/absence of a collision with the other vehicle/obstacle based on results of the detection by the imaging system 701 and the vehicle sensors 710. According to this determination, the vehicle is controlled for avoiding the collision when the collision is predicted, and a safety apparatus is actuated at the time of the collision.

Further, the imaging system 701 is also connected to a warning apparatus 712 that issues a warning to a driver based on a result of the determination by the collision determination unit. For example, when a collision possibility is high as the result of the determination by the collision determination unit, the main control unit 713 controls the vehicle so as to avoid the collision or reduce damage by, for example, braking the vehicle, returning an accelerator, and/ or reducing an engine output. The warning apparatus 712 warns the user by, for example, sounding a warning such as a sound, displaying warning information on a screen of a display unit such as a car navigation system and an instrument panel, and/or vibrating a seat belt or a steering wheel.

In the present exemplary embodiment, surroundings of the vehicle, such as a scenery in front of or behind the vehicle, are imaged by the imaging system 701. FIG. 12B illustrates an example of a layout of the imaging system 701 in the case where the scenery in front of the vehicle is imaged by the imaging system 701.

The two imaging apparatuses 702 are arranged on the front side of the vehicle 700. More specifically, assuming that the central line of an advancing/retreating direction or an outer shape (for example, a vehicle width) of the vehicle 700 is a symmetry axis, it is desirable to arrange the two imaging apparatuses 702 line-symmetrically with respect to this symmetry axis from the viewpoint of acquiring the distance information between the vehicle 700 and the imaging target and determining the collision possibility. Further, it is desirable to arrange the imaging apparatuses 702 in such a manner that they do not block the driver's sight when the driver visually confirms a condition outside the vehicle 700 from a driver's seat. It is desirable to arrange the warning apparatus 712 in such a manner that the driver can easily keep the warning apparatus 712 in sight.

Next, an operation for detecting a failure in each of the imaging apparatuses 702 that is performed by the imaging system 701 will be described with reference to FIG. 13. The operation for detecting a failure in the imaging apparatus 702 is performed according to steps S810 to S880 illustrated in FIG. 13.

Step S810 is a step in which the imaging system 701 configures a setting of the imaging apparatus 702 at the time of a startup. More specifically, a setting for the operation of the imaging apparatus 702 is transmitted from outside the imaging system 701 (for example, the main control unit 713) or inside the imaging system 701 to start the imaging operation of the imaging apparatus 702 and the operation for detecting a failure in the imaging apparatus 702.

Next, in step S820, the imaging system 701 acquires pixel signals from effective pixels. Further, in step S830, the imaging system 701 acquires an output value from a failure detection pixel provided for the failure detection. This failure detection pixel includes the photoelectric conversion unit, similarly to the effective pixels. A predetermined voltage is written into this photoelectric conversion unit. The failure detection pixel outputs a signal corresponding to the voltage written in this photoelectric conversion unit. Step 820 and step S830 may be reversed.

Next, in step S840, the imaging system 701 makes a match determination between an output expected value of the failure detection pixel and an actual output value from the failure detection pixel.

If the output expected value and the actual output value match each other as a result of the match determination in step S840 (YES in step S840), the processing proceeds to step S850, in which the imaging system 701 determines that the imaging operation is performed normally. Then, the processing proceeds to step S860. In step S860, the imaging system 701 transmits the pixel signals of the scanned row to the memory 705 for primary storage. After that, the processing returns to step S820, from which the imaging system 701 continues the operation for detecting a failure.

On the other hand, if the output expected value and the actual output value do not match each other as the result of the match determination in step S840 (NO in step S840), the processing step proceeds to step S870. In step S870, the imaging system 701 determines that there is abnormality in the imaging operation, and issues a warning to the main control unit 713 or the warning apparatus 712. The warning apparatus 712 displays on the display unit that the abnormality is detected. After that, in step S880, the imaging system 701 stops the imaging apparatus 702, and ends the operation of the imaging system 701.

In the present exemplary embodiment, the operation for detecting a failure has been described referring to the example in which the flowchart is looped every time one row is processed, but may be looped every time a plurality of rows is processed or the operation for detecting a failure may be performed frame by frame.

The issue of the warning in step S870 may be notified to outside the vehicle 700 via a wireless network.

Further, in the present exemplary embodiment, the imaging system has been described referring to the control for preventing the vehicle 700 from colliding with the other vehicle, but can also be applied to control for autonomously driving the vehicle 700 so as to cause the vehicle 700 to follow the other vehicle, control for autonomously driving the vehicle 700 so as to prevent the vehicle 700 from departing from a traffic lane, and the like. Further, the imaging system 701 can be applied to not only the vehicle such as the vehicle on which the imaging system 701 is mounted but also a moving object (a moving apparatus) such as a ship, an airplane, or an industrial robot. In addition, the imaging system 701 can be applied to not only the moving object but also an apparatus using object recognition in a wide range of manners, such as an intelligent transportation system (ITS).

The present disclosure can be modified in various manners without being limited to the above-described exemplary embodiments.

Further, the exemplary embodiments of the present disclosure also include examples in which a part of the configuration of any of the exemplary embodiments is added to another exemplary embodiment or is replaced with a part of the configuration of another exemplary embodiment.

Further, all the above-described exemplary embodiments merely indicate examples of how to embody the present disclosure when implementing the present disclosure, and the technical scope of the present disclosure shall not be constructed limitedly by the disclosures of these examples. In other words, the present disclosure can be implemented in various manners without departing from the technical idea thereof or the main features thereof.

The present disclosure provides the imaging apparatus having the beneficial connection relationship between the pixels and the AD conversion units in the case where the color filter of the first color is disposed on the plurality of first pixels and the color filter of the second color is disposed on the plurality of second pixels.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-192057, filed Sep. 29, 2017, which is hereby incorporated by reference herein in its entirety.

What is claimed is:

1. An imaging apparatus comprising:
a first chip including
a plurality of first pixels each including a color filter of a first color and arranged in a plurality of rows and a plurality of columns, and
a plurality of second pixels each including a color filter of a second color that is a different color from the first color, the plurality of second pixels being arranged in a plurality of rows and a plurality of columns;
a second chip including a first analog-to-digital (AD) conversion unit, a second AD conversion unit, a first selection unit and a second selection unit;
a first signal line to which the plurality of first pixels arranged in a first column among the plurality of columns is connected;
a second signal line to which the plurality of second pixels arranged in a second column among the plurality of columns is connected;
a third signal line to which the plurality of first pixels arranged in a third column among the plurality of columns is connected; and
a fourth signal line to which the plurality of second pixels arranged in a fourth column among the plurality of columns is connected,
wherein the first signal line and the third signal line are connected to the first AD conversion unit via the first selection unit, and
wherein the second signal line and the fourth signal line are connected to the second AD conversion unit via the second selection unit,
wherein the first selection unit selectively connects one of the first signal line and the third signal line to the first AD conversion unit,
wherein the second selection unit selectively connects one of the second signal line and the fourth signal line to the second AD conversion unit.

2. An imaging apparatus comprising:
a first chip including
a plurality of first pixels each including a color filter of a first color and arranged in a plurality of rows and a plurality of columns,
a plurality of second pixels each including a color filter of a second color that is a different color from the first color, the plurality of second pixels being arranged in a plurality of rows and a plurality of columns, a first signal line to which the plurality of first pixels arranged in a first column among the plurality of columns is connected, a second signal line to which the plurality of second pixels arranged in a second column among the plurality of columns is connected, a third signal line to which the plurality of first pixels arranged in a third column among the plurality of columns is connected, a fourth signal line to which the plurality of second pixels arranged in a fourth column among the plurality of columns is connected, a first connection portion to which the first signal line is connected, a second connection portion to which the second signal line is connected, a third connection portion to which the third signal line is connected, and a fourth connection portion to which the fourth signal line is connected; and a second chip including a first AD conversion unit, a second AD conversion unit, a first selection unit, a second selection unit, a fifth connection portion and a sixth connection portion each connected to the first AD conversion unit via the first selection unit, and a seventh connection portion and an eighth connection portion each connected to the second AD conversion unit via the second selection unit, wherein the first connection portion and the fifth connection portion are connected to each other, wherein the third connection portion and the sixth connection portion are connected to each other, wherein the second connection portion and the seventh connection portion are connected to each other, and wherein the fourth connection portion and the eighth connection portion are connected to each other wherein the first selection unit selectively connects one of the first signal line and the third signal line to the first AD conversion unit, wherein the second selection unit selectively connects one of the second signal line and the fourth signal line to the second AD conversion unit.

3. The imaging apparatus according to claim 2, wherein the first connection portion and the fifth connection portion overlap the first AD conversion unit in a planar view, and wherein the second connection portion and the seventh connection portion overlap the second AD conversion unit in the planar view.

4. The imaging apparatus according to claim 2, wherein the first chip includes a plurality of first sets each including the plurality of first pixels, the first signal line, and the first connection portion, and a plurality of second sets each including the plurality of second pixels, the second signal line, and the second connection portion, and wherein the second chip includes a plurality of fifth connection portions, a plurality of seventh connection portions, wherein the first selection unit includes an input unit to which the plurality of fifth connection portions is connected and an output unit connected to the first AD conversion unit, and wherein the second selection unit includes an input unit to which the plurality of seventh connection portions is connected and an output unit connected to the second AD conversion unit.

5. The imaging apparatus according to claim 3, wherein the first chip includes a plurality of first sets each including the plurality of first pixels, the first signal line, and the first connection portion, and a plurality of second sets each including the plurality of second pixels, the second signal line, and the second connection portion, and wherein the second chip includes a plurality of fifth connection portions, a plurality of seventh connection portions, wherein the first selection unit includes an input unit to which the plurality of fifth connection portions is connected and an output unit connected to the first AD conversion unit, and wherein the second selection unit includes an input unit to which the plurality of seventh connection portions is connected and an output unit connected to the second AD conversion unit.

6. The imaging apparatus according to claim 1, wherein the plurality of first pixels and the plurality of second pixels overlap the first AD conversion unit in a planar view.

7. The imaging apparatus according to claim 2, wherein the plurality of first pixels and the plurality of second pixels overlap the first AD conversion unit in a planar view.

8. The imaging apparatus according to claim 1, wherein each of the first AD conversion unit and the second AD conversion unit is a successive-approximation type AD converter.

9. The imaging apparatus according to claim 1, wherein each of the first AD conversion unit and the second AD conversion unit includes a comparator configured to compare a ramp signal and a signal output from the pixel.

10. The imaging apparatus according to claim 2, wherein each of the first AD conversion unit and the second AD conversion unit includes a comparator configured to compare a ramp signal and a signal output from the pixel.

11. The imaging apparatus according to claim 1, wherein a peak wavelength of a transmittance is different between the color filter of the first color and the color filter of the second color.

12. The imaging apparatus according to claim 2, wherein a peak wavelength of a transmittance is different between the color filter of the first color and the color filter of the second color.

13. The imaging apparatus according to claim 1, wherein each of the plurality of first pixels and the plurality of second pixels includes a photoelectric conversion unit and an amplification transistor configured to output a signal based on a charge of the photoelectric conversion unit, wherein the first chip includes a first wiring to which each of the plurality of first pixels and the plurality of second pixels is connected, wherein the second chip includes a current source and a second wiring connected to the current source, and wherein the current source supplies a current to the amplification transistor via the second wiring and the first wiring.

14. The imaging apparatus according to claim 2, wherein each of the plurality of first pixels and the plurality of second pixels includes a photoelectric conversion unit and an amplification transistor configured to output a signal based on a charge of the photoelectric conversion unit, wherein the first chip includes a first wiring to which each of the plurality of first pixels and the plurality of second pixels is connected, wherein the second chip includes a current source and a second wiring connected to the current source, and wherein the current source supplies a current to the amplification transistor via the second wiring and the first wiring.

15. An imaging system comprising:
the imaging apparatus according to claim 1; and
a signal processing unit configured to generate an image by processing a signal output by the imaging apparatus.

16. An imaging system comprising:
the imaging apparatus according to claim 2; and
a signal processing unit configured to generate an image by processing a signal output by the imaging apparatus.

17. A moving object comprising:
the imaging apparatus according to claim 1; and
a distance information acquisition unit configured to acquire distance information to a target from a parallax image based on a signal from the imaging apparatus,
the moving object further comprising a control unit configured to control the moving object based on the distance information.

18. A moving object comprising:
the imaging apparatus according to claim 2; and
a distance information acquisition unit configured to acquire distance information to a target from a parallax image based on a signal from the imaging apparatus,
the moving object further comprising a control unit configured to control the moving object based on the distance information.

19. A circuit chip for an imaging apparatus including a pixel chip and the circuit chip laminated on each other, the pixel chip including a plurality of first pixels each including a color filter of a first color and arranged in a plurality of rows and a plurality of columns and a plurality of second pixels each including a color filter of a second color that is a different color from the first color, the plurality of second pixels being arranged in a plurality of rows and a plurality of columns, the circuit chip comprising:

a first AD conversion unit;
a second AD conversion unit;
a first selection unit;
a second selection unit;
a fifth connection portion and a sixth connection portion each connected to the first AD conversion unit via the first selection unit; and
a seventh connection portion and an eighth connection portion each connected to the second AD conversion unit via the second selection unit,
wherein the fifth connection portion is a connection portion for connecting to a first connection portion,
wherein the sixth connection portion is a connection portion for connecting to a third connection portion,
wherein the seventh connection portion is a connection portion for connecting to a second connection portion, and
wherein the eighth connection portion is a connection portion for connecting to a fourth connection portion,
wherein the first selection unit selectively connects one of the first signal line and the third signal line to the first AD conversion unit,
wherein the second selection unit selectively connects one of the second signal line and the fourth signal line to the second AD conversion unit.

20. The imaging apparatus according to claim 1, wherein each of the first selection unit and the second selection unit is a multiplex circuit.

21. The imaging apparatus according to claim 2, wherein each of the first selection unit and the second selection unit is a multiplex circuit.

22. The circuit chip according to claim 19, wherein each of the first selection unit and the second selection unit is a multiplex circuit.

* * * * *